US008214246B2

(12) United States Patent
Springfield et al.

(10) Patent No.: US 8,214,246 B2
(45) Date of Patent: Jul. 3, 2012

(54) METHOD FOR PERFORMING RETAIL SALES ANALYSIS

(75) Inventors: Paul Springfield, London (GB); Edwin Blake, London (GB); David Stern, London (GB)

(73) Assignee: dunnhumby limited, London (GB)

( * ) Notice: Subject to any disclaimer, the term of this patent is extended or adjusted under 35 U.S.C. 154(b) by 2231 days.

(21) Appl. No.: 10/955,946

(22) Filed: Sep. 30, 2004

(65) Prior Publication Data

US 2006/0069585 A1    Mar. 30, 2006

(51) Int. Cl.
*G06Q 30/00* (2012.01)
(52) U.S. Cl. ...................................... 705/7.29
(58) Field of Classification Search .................. 705/7.29
See application file for complete search history.

(56) References Cited

U.S. PATENT DOCUMENTS

| | | | | |
|---|---|---|---|---|
| 5,377,095 A | * | 12/1994 | Maeda et al. | 705/7.35 |
| 5,490,060 A | | 2/1996 | Malec et al. | |
| 5,832,496 A | * | 11/1998 | Anand et al. | 1/1 |
| 5,845,276 A | * | 12/1998 | Emerson et al. | 1/1 |
| 5,873,069 A | | 2/1999 | Reuhl et al. | |
| 5,893,076 A | * | 4/1999 | Hafner et al. | 705/28 |
| 5,930,764 A | * | 7/1999 | Melchione et al. | 705/7.29 |
| 5,940,815 A | * | 8/1999 | Maeda et al. | 706/12 |
| 5,953,707 A | * | 9/1999 | Huang et al. | 705/7.25 |
| 5,956,693 A | * | 9/1999 | Geerlings | 705/14.53 |
| 5,966,695 A | * | 10/1999 | Melchione et al. | 705/7.33 |
| 5,974,396 A | * | 10/1999 | Anderson et al. | 705/7.33 |
| 5,987,425 A | | 11/1999 | Hartman et al. | |
| 5,999,908 A | * | 12/1999 | Abelow | 705/7.32 |
| 6,073,112 A | * | 6/2000 | Geerlings | 705/14.53 |
| 6,078,891 A | * | 6/2000 | Riordan et al. | 705/7.34 |

(Continued)

FOREIGN PATENT DOCUMENTS

EP    1315112 A2    5/2003

(Continued)

OTHER PUBLICATIONS

Magi, A.W., Share of Wallet in Retailing: The Effects of Customer Satisfaction, Loyalty Cards, and Shopper Characteristics (2003), Journal of Retailing: vol. 79, pp. 97-106.*

(Continued)

*Primary Examiner* — Andre Boyce
*Assistant Examiner* — Tiphany Dickerson
(74) *Attorney, Agent, or Firm* — Baker & Hostetler LLP

(57) ABSTRACT

The invention provides a user with substantial flexibility in requesting and generating analysis projects on transaction and/or consumer data that is stored in one or more databases. Exemplary embodiments of the invention provide a method for retailers and other authorized users, such as suppliers, to access and perform sophisticated, highly specialized analysis on transaction and/or consumer data, such as retail sales and consumer data, from a remote location using an internet connected computer. The transaction and/or consumer data that is accessed can be a compilation of retail transaction data (collected from EPOS systems, for example) and/or consumer data (which has been collected from frequent-shopper or loyalty cards used by consumers when they shop, for example). Projects are generated as spreadsheet based interactive reports, which are easy to manipulate for further analysis and presentations. Insights from these projects can lead to better decisions on new product launches, sampling, merchandizing, assortment, distribution, and other sales and marketing priorities. Exemplary projects may be interactive, allowing the user to manipulate and extract information which is specific to the user's particular needs.

74 Claims, 20 Drawing Sheets

U.S. PATENT DOCUMENTS

| | | | |
|---|---|---|---|
| 6,078,924 A * | 6/2000 | Ainsbury et al. | 1/1 |
| 6,151,582 A * | 11/2000 | Huang et al. | 705/7.25 |
| 6,230,143 B1 | 5/2001 | Simons et al. | |
| 6,523,027 B1 | 2/2003 | Underwood | |
| 6,677,963 B1 * | 1/2004 | Mani et al. | 715/764 |
| 6,678,685 B2 | 1/2004 | McGill et al. | |
| 6,976,000 B1 * | 12/2005 | Manganaris et al. | 705/7.33 |
| 7,024,409 B2 | 4/2006 | Iyengar | |
| 7,047,251 B2 * | 5/2006 | Reed et al. | 1/1 |
| 7,346,518 B1 * | 3/2008 | Frank et al. | 705/310 |
| 7,523,048 B1 * | 4/2009 | Dvorak | 705/7.31 |
| 7,552,066 B1 * | 6/2009 | Landvater | 705/7.25 |
| 7,567,918 B2 * | 7/2009 | Manganaris et al. | 705/14.41 |
| 2001/0011247 A1 * | 8/2001 | O'Flaherty et al. | 705/39 |
| 2001/0014868 A1 * | 8/2001 | Herz et al. | 705/14 |
| 2001/0054003 A1 * | 12/2001 | Chien et al. | 705/14 |
| 2002/0026348 A1 * | 2/2002 | Fowler et al. | 705/10 |
| 2002/0046085 A1 | 4/2002 | Rochon et al. | |
| 2002/0046116 A1 * | 4/2002 | Hohle et al. | 705/14 |
| 2002/0072974 A1 | 6/2002 | Pugliese, III et al. | |
| 2002/0099563 A1 * | 7/2002 | Adendorff et al. | 705/1 |
| 2002/0099579 A1 | 7/2002 | Stowell et al. | |
| 2002/0099598 A1 | 7/2002 | Eicher, Jr. et al. | |
| 2002/0111890 A1 * | 8/2002 | Sloan et al. | 705/36 |
| 2002/0116348 A1 * | 8/2002 | Phillips et al. | 705/400 |
| 2002/0169658 A1 * | 11/2002 | Adler | 705/10 |
| 2002/0194117 A1 * | 12/2002 | Nabe et al. | 705/38 |
| 2003/0009393 A1 * | 1/2003 | Norris | 705/27 |
| 2003/0055710 A1 | 3/2003 | Burk et al. | |
| 2003/0088460 A1 * | 5/2003 | Riordan et al. | 705/10 |
| 2003/0200144 A1 * | 10/2003 | Antonucci et al. | 705/14 |
| 2004/0044580 A1 | 3/2004 | Haller | |
| 2005/0192930 A1 * | 9/2005 | Hightower et al. | 707/1 |
| 2006/0085220 A1 * | 4/2006 | Frank et al. | 705/1 |
| 2006/0085255 A1 * | 4/2006 | Hastings et al. | 705/14 |

FOREIGN PATENT DOCUMENTS

| | | |
|---|---|---|
| EP | 1315112 A3 | 2/2004 |
| GB | 2364805 A | 2/2002 |
| WO | WO 97/46950 A1 | 12/1997 |

OTHER PUBLICATIONS

Hoare, S., "Know the Clients, Meet Their Needs," (Apr. 11, 2001), The Times, London, p. ECRM 9.*

Clayton-Smith, D., "Do It All's Loyalty Programme—and Its Impact on Customer Retention," (1996), Managing Service Quality: vol. 6, Iss. 5, p. 33.*

Non-Final Office action, mailed Nov. 28, 2008, U.S. Appl. No. 11/073,354, 47 pgs.

Final Office action, mailed Jul. 7, 2009, U.S. Appl. No. 11/073,354, 13 pgs.

Examiner's first report on Patent Application No. 2005288685, dated Mar. 23, 2010, 3 pages.

Humby, et al, Scoring Points—How Tesco is Winning Customer Loyalty, Copyright 2003, pp. 35, 38-51, 54-57, 71-75, 98-112, 133-149, 151-163, Kogan Page Limited, London, England and Sterling, VA.

T Berners-Lee et al, Hypertext Transfer Protocol-HTTP/1.0, Network Working Group, Request for Comments:1945, published May 1996, available from http://www.w3.org/Protocols/rfc1945/rfc1945 sections 10.16 to 12.5.

Mosaic User Authentication Tutorial, NSCA HTTPd Development Team, Sep. 27, 1995, available from http://hoohoo.nsca.uiuc.edu/docs/tutorials/user.html.

* cited by examiner

Welcome to the Acme Shop, ebd!

The latest week of data is for the week beginning 22-Mar-2004
Please choose the job you would like to run from the tree below:

- Customer insight reports (Standard)
  - How are people repeat purchasing my product?
  - How are people repeat purchasing my product by store type?
  - What new products should I be interested in? (Internal New Product Alert)
  - How have I used The Shop?
  - How have my clients used The Shop?
  - How many people cross-shop my brands by store type?
  - How many people cross-shop my brands?
  - How do people shop across my category?
  - What are the key measures for my products?
  - What are the key measures for my products over time?
  - How does my brand sell over time?
  - What are the weekely key measures for my products? — 67
  - What other products are found in my consumers' baskets?
  - Where is my brand sold? (Product Level)
  - Where is my brand sold?
  - Who buys my brand over time by store type?
  - Who buys my brand over time?
  - Who buys my brand by store type?
  - Who buys my brand
- Customer insight reports (Regional)
  - How are people repeat purchasing my prduct? (Regional)
  - How are people repeat purchasing my product by store type? (Regional)
  - How many people cross-shop my brands? (Regional)
  - How do people shop across my category? (Regional)
  - What are the key measures for my products? (Regional)
  - What are the key measures for my products over time? (Regional)
  - How does my brand sell over time? (Regional)
  - What are the weekly key measures for my products? (Regional)
  - What other products are found in my consumers' baskets? (Regional)
  - Where is my brand sold? (Product Level) (Regional)
  - Where is my brand sold? (Regioanl)
  - Who buys my brand over time? (Regional)
  - Who buys my brand? (Regional)
- Extracts
  - Generate a cube for my sections
  - Generate a cube for my subgroups
  - How big will my cube be
  - Kalman Filter launch predictor
  - Zodiac Crucible Extract
  - Zodiac Crucible Extract (Loyals)

What are the weekly key measures for my products?
1. Pick Subgroups from the following list
Limited to 1000 RTNs
This is the list of valid Subgroups you may choose from:

Cancel  Back  Next

Please select between 1 and 10 items from the tree below:

```
- 🗁 Acme
     + 🗀 Public
     + 🗀 Published
     - 🗁 edb                ← 68
          - 🗁 New Subgroups
               ☐ 🛒 Bobs Cheeses  ― 70
          + 🗀 Old Subgroups
          + 🗀 QC Model
          + 🗀 QC Queries
+ 🗀 US Products
```

Bobs Cheeses

▶

◀

1 item selected

FIG. 3

What are the weekly key measures for my products?
1. Pick a period from the following list
This is the list of valid week periods you may choose from:

Cancel  Back  Next

Please select one item from th 958 items below:

Show:
First 200

Search for:
[      ]

[Select]
[All]
[Invert]

Selections
Now:  0
Min:  1
Max:  1

The week 22-Mar-2004 to 28-Mar-2004 ―― 74
2 weeks from 15-Mar-2004 to 28-Mar-2004
3 weeks from 8-Mar-2004 to 28-Mar-2004
4 weeks from 1-Mar-2004 to 28-mar-2004
5 weeks from 23-Feb-2004 to 28-Mar-2004
7 weeks from 9-Feb-2004 to 28-Mar-2004         ╱ 72
8 weeks from 2-Feb-2004 to 28-Mar-2004
9 weeks from 26-Jan-2004 to 28-Mar-2004
12 weeks from 5-Jan-2004 to 28-Mar-2004
13 weeks from 29-Dec-2003 to 28-Mar-2004
18 weeks from 24-Nov-2003 to 28-Mar-2004
26 weeks from 29-Sept-2003 to 28-Mar-2004
52 weeks from 31-Mar-2003 to 28-Mar-2004
The week 15-Mar-2004 to 21-Mar-2004
The week 8-Mar-2004 to 14-Mar-2004
The week 1-Mar-2004 to 7-Mar-2004
The week 23-Feb-2004 to 29-Feb-2004
The week 16-Feb-2004 to 22-Feb-2004
The week 9-Feb-2004 to 15-Feb-2004
The week 2-Feb-2004 to 8-Feb-2004
The week 26-Jan-2004 to 1-Feb-2004
The week 19-Jan-2004 to 25-Jan-2004
The week 12-Jan-2004 to 18-Jan 2004

FIG. 4

There are no more questions.
Click the Finish button to submit your answers.

| You Ordered |
|---|
| What are the weekly key measures for my products? For: |
| Bobs Cheeses |
| The week 22-Mar-2004 to 28-Mar-2004 |

[ Cancel ]  [ Back ]  [ Next ]

What other products are found in my consumers baskets?

Time Period: 8 Weeks from 8 September 2003 to 2 November 2003
Core Subgroup(s): Veg Main
Secondary Universe: Fzy Meal Accompaniments, Fzn International Meals, Frozen Ready Meals
Selected regions: All US

| Number of baskets containing products from selected subgroup(s). | Number of customers buying products from selected subgroup(s). |
|---|---|
| 366,910 | 238,330 |

[ Export table ]  [ Sort Order ]

Any Thrifty product bought with the Core Subgroup(s).
The default sorting by Significance (descending) showing the toop 100 Thrifty products that are not frequently bought with your Core Subgroup(s), relative to their own sales.

| Product Name | Number of baskets | Customer Count | Product Penetration | Significance |
|---|---|---|---|---|
| Bichiere Balls Al Forno 400G | 830 | 820 | 0.2% | 16.9% |
| Grande Spaghetti Cabonara 400G | 520 | 490 | 0.1% | 16.4% |
| Grande Sweet & Sour 400G | 630 | 580 | 0.2% | 15.9% |
| Grande Spaghetti Bolognese 400G | 1,090 | 1,040 | 0.3% | 14.0% |
| Grande Swedish Style Balls 200G | 1,490 | 1,330 | 0.4% | 13.4% |
| Grande Z Peppered Steaks 196G | 2,520 | 2,300 | 0.7% | 12.6% |
| Grande Tikka Marsala & Pilaf Rice 400G | 1,720 | 1,540 | 0.5% | 12.3% |
| Grande Lasagna 300G | 2,210 | 1,830 | 0.8% | 11.8% |
| Bichiere Foods Cumberland Veggisausages 250G | 1,010 | 800 | 0.3% | 11.7% |
| Grande Cottage Pie 500G | 4,790 | 4,280 | 1.3% | 11.5% |
| Bichiere Foods Unos Vegetariansauage 250G | 5,000 | 7,090 | 2.2% | 11.2% |
| Grande Filets Wine MRoom Soe 325G | 8,250 | 1,550 | 0.5% | 11.5% |
| Bichiere Foods S/Dried tomt Andoulie Saus 260G | 1,680 | 2,570 | 0.8% | 10.5% |
| Grande Premium Burgers 164G | 2,900 | 1,270 | 0.4% | 10.1% |
| Thrifty vegetaian2 Creamy Pepper Escalopes 300G | 1,510 | 2,150 | 0.7% | 9.9% |
| Grande Lamb Flavour Grills 180G | 2,420 | 1,490 | 0.5% | 9.6% |
| Grande 2 Lemon & Pepperfillet 200G | 1,720 | 3,890 | 1.3% | 9.5% |
| Grande Sausage 250G | 4,630 | 4,430 | 1.4% | 8.5% |
| Thrifty Vegetariantoad in The Hole 190G | 5,180 | 3,510 | 1.2% | 8.5% |

[ Toolbars ] [ Glossary ] [ Print ] [ Contact Us ]

| Number of baskets containing products from selected subgroup(s) and Selected Universe. | Number of customers buying products from selected subgroup(s) and Selected Universe. |
|---|---|
| 43,020 | 34,500 |

[ Sort Order ]  [ Export table ]

Products in the Secondary Universe that are bought with the Core Subgroup(s).
The default sorting by Product Penetration (descending) showing the products from the Secondary Subgroup(s) that are most frequently bought with your Core Subgroup(s).

| Product Name | Number of baskets | Customer Count | Product Penetration | Significance |
|---|---|---|---|---|
| Grande Balls Al Forno 400G | 830 | 820 | 0.2% | 16.9% |
| Grande Spaghetti Cabonara 400G | 520 | 490 | 0.1% | 16.4% |
| Grande Sweet & Sour 400G | 630 | 580 | 0.2% | 15.9% |
| Grande Spaghetti Bolognese 400G | 1,090 | 1,040 | 0.3% | 14.0% |
| Grande Swedish Style Balls 200G | 1,490 | 1,330 | 0.4% | 13.4% |
| Grande Z Peppered Steaks 196G | 2,520 | 2,300 | 0.7% | 12.6% |
| Grande Tikka Marsala & Pilaf Rice 400G | 1,720 | 1,540 | 0.5% | 12.3% |
| Grande Lasagna 300G | 2,210 | 1,830 | 0.8% | 11.8% |
| Bichiere Foods Cumberland Veggisausages 250G | 1,010 | 800 | 0.3% | 11.7% |
| Grande Cottage Pie 500G | 4,790 | 4,280 | 1.3% | 11.5% |
| Bichiere Foods Unos Vegetariansauage 250G | 5,000 | 7,090 | 2.2% | 11.2% |
| Grane Filets Wine MRoom Soe 325G | 8,250 | 1,550 | 0.5% | 11.5% |
| Bichiere Foods S/Dried tomt Andoulie Saus 260G | 1,680 | 2,570 | 0.8% | 10.5% |
| Grande Premium Burgers 164G | 2,900 | 1,270 | 0.4% | 10.1% |
| Thrifty vegetaian2 Creamy Pepper Escalopes 300G | 1,510 | 2,150 | 0.7% | 9.9% |
| Grande Lamb Flavour Grills 180G | 2,420 | 1,490 | 0.5% | 9.6% |
| Grande 2 Lemon & Pepperfillet 200G | 1,720 | 3,890 | 1.3% | 9.5% |
| Grande Sausage 250G | 4,630 | 4,430 | 1.4% | 8.5% |
| Thrifty Vegetariantoad in The Hole 190G | 5,180 | 3,510 | 1.2% | 8.5% |

FIG. 7D

Where is my brand sold (Product level)?

Subgroup selected: Tim Noodles MM2
Time Period: 52 weeks from 4 November 2002 to 2 November 2003
Selected region(s): US

Select Product To
Total Subgroup ▼

Toolbars | Print | Glossary | Export table | Export units per store/product | Contact Us

166

| | Customers | Units sold | Value of sales | Customers | Units sold | Value of sales | Customer Penetration | Spend per Customer |
|---|---|---|---|---|---|---|---|---|
| | | 162 | 160 | 164 | 170 | | | 170 |
| | | | Overall Total Subgroup sales | % of all Total Subgroup sales | | Performance Measures | | |
| Sales Total | | | | | | | | |
| All stores | 2,005,980 | 13,392,980 | $11,521,281 | 100% | 100% | 100% | 13.5% | $5.74 |

| Sales by Store Type | Customers | Units sold | Value of sales | Customers | Units sold | Value of sales | Customer Penetration | Spend per Customer |
|---|---|---|---|---|---|---|---|---|
| Mega ☐ | 436,180 | 2,502,760 | $2,185,044 | 21.7% | 18.7% | 19.0% | 8.7% | $5.01 |
| Superstore ☒ | 1,565,510 | 10,190,840 | $8,940,304 | 78.0% | 77.6% | 77.6% | 12.5% | $5.71 |
| City ☐ | 88,910 | 422,690 | $338,015 | 4.4% | 3.2% | 3.2% | 3.5% | $3.80 |
| Quick ☐ | 30,870 | 76,300 | $57,918 | 1.5% | 0.6% | 0.6% | 2.1% | $1.88 |

Sort Order | Table Updates

The table below is for Superstore stores in descending order based on Units sold

| Sales by Store | Customers | Units sold | Value of sales | Customers | Units sold | Value of sales | Customer Penetration | Spend per Customer |
|---|---|---|---|---|---|---|---|---|
| 2840 LISBURN BENTRIM ROAD (Superstore) | 9,120 | 68,410 | $55,847 | 0.45% | 0.51% | 0.57% | 16.85% | $7.22 |
| 3429 WORKINGTON 2 (Superstore) | 6,530 | 58,830 | $53,945 | 0.33% | 0.44% | 0.47% | 17.87% | $8.26 |
| 2550 FALKIRK (Superstore) | 8,990 | 54,370 | $48,511 | 0.45% | 0.41% | 0.42% | 12.23% | $5.40 |
| 2797 KNOCKNAGONEY (Superstore) | 9,830 | 53,950 | $47,345 | 0.49% | 0.40% | 0.41% | 11.60% | $4.82 |
| 2715 NEWTON ABBOT (Superstore) | 10,300 | 52,910 | $48,008 | 0.51% | 0.40% | 0.42% | 13.67% | $4.56 |
| 2920 NEWTOWNABBEY (Superstore) | 7,730 | 51,850 | $46,541 | 0.39% | 0.39% | 0.40% | 8.65% | $6.03 |
| 2572 GILLINGHAM (Superstore) | 8,190 | 50,950 | $43,272 | 0.41% | 0.39% | 0.38% | 9.94% | $5.28 |
| 3440 WORCHESTER 2 (Superstore) | 6,800 | 50,070 | $42,190 | 0.34% | 0.38% | 0.37% | 10.96% | $6.20 |
| 3133 SALISBURY 2 (Superstore) | 7,130 | 48,710 | $39,046 | 0.36% | 0.37% | 0.38% | 8.34% | $5.48 |
| 2427 DUDLEY (Superstore) | 7,720 | 42,190 | $43,209 | 0.38% | 0.36% | 0.38% | 11.31% | $5.60 |
| 3348 WALKDEN (Superstore) | 6,480 | 47,840 | $38,340 | 0.32% | 0.36% | 0.33% | 12.00% | $5.92 |
| 2154 Bridgend 2 (Superstore) | 8,360 | 47,710 | $47,448 | 0.42% | 0.36% | 0.41% | 9.86% | $5.68 |
| 2030 ANDOVER (Superstore) | 6,780 | 47,220 | $36,764 | 0.34% | 0.36% | 0.34% | 11.76% | $5.72 |
| 2918 NEATH ABBEY (Superstore) | 7,420 | 47,100 | $39,034 | 0.37% | 0.35% | 0.34% | 13.32% | $5.45 |
| 3039 PLYMOUTH TRANSIT WAY (Superstore) | 7,500 | 46,860 | $40,473 | 0.37% | 0.36% | 0.35% | 11.52% | $5.20 |
| 2582 GREENOCK 1 (Superstore) | 7,230 | 46,710 | $41,965 | 0.36% | 0.36% | 0.36% | 14.67% | $5.80 |
| 2025 ALDERSHOT (Superstore) | 6,770 | 46,060 | $37,019 | 0.34% | 0.32% | 0.32% | 6.96% | $5.47 |
| 2900 MEIR (Superstore) | 6,750 | 45,780 | $42,711 | 0.34% | 0.37% | 0.37% | 10.89% | $6.33 |
| 2173 BANGOR NI (Superstore) | 6,970 | 45,750 | $40,315 | 0.35% | 0.35% | 0.35% | 12.66% | $5.79 |
| 2387 DALKEITH HARDENGREEN (Superstore) | 6,900 | 45,580 | $38,708 | 0.34% | 0.34% | 0.34% | 11.42% | $5.61 |

What do my key measures look like over time?

Subgroup: Jan Wu FRYs
Most recent period: 02-Dec-2002 to 23-Feb-2003 (12 weeks)
Previous period: 03-Dec-2001 to 24-Feb-2003 (12 weeks)

Select product of interest: All products together ▼

| Measure | Most recent period | Previous period | Index |
|---|---|---|---|
| Units sold | 1,365,470 | 2,634,610 | 52 |
| Value of sales | $1,837,003 | $4,332,573 | 42 |
| Number of customers | 341,740 | 541,600 | 63 |
| Number of visits | 694,080 | 1,125,520 | 62 |
| Store Selling Distribution | 703 | 680 | 103 |
| Value of sales per store | $2,613 | $6,371 | 41 |
| Maket Share (value) | 5.42% | 11.61% | 49 |
| Customer penetration | 3.16% | 5.28% | 60 |
| Visits per customer | 2.03 | 2.08 | 98 |
| Spend per visits | $2.65 | $3.85 | 69 |
| Spend per customer | $5.38 | $8.00 | 67 |
| Price per unit | $1.35 | $1.64 | 82 |
| Units per customer | 4.00 | 4.86 | 82 |
| Units per visit | 1.97 | 2.34 | 84 |

Toolbars | Glossary | Print | Export Chart | Export Table | Contact Us

Changes in key measures

The value of sales has decreased markedly from $4,332,573 to $1,837,003 which equals a decrease of 58%. The number of units sold has decreased by 48% and the market share has gone from 11.16% to 5.42%.

341,740 customers bought All products together in the most recent period compared to 541,600 in the previous period.

What has driven these changes?

"No. of customers", "Visits per customer", "Unit price", and "Spend per visit" are the measures that have created the decrease in the value of sales.

Even though the store distribution has increased the value of sales has decreased Neither has the increase in the store distribution caused an increase in the number of customers.

FIG. 7I

Current Jobs at 4/14/2004 4:36:10 PM. The shop has 2 jobs for Bobs Cheeses. Show jobs for edb

| ! | Job | Name | Status | Description |
|---|-----|------|--------|-------------|
| 0 | 61126 | edb | PROCESSING | What are the weekly key measures for my products? For: Bobs cheese, The Week 22-Mar-2004 to 28-Mar-2004 |
| 0 | 61127 | edb | PROCESSING | What are the weekly key measures for my products? For: Bobs cheese, The Week 22-Mar-2004 to 28-Mar-2004 |

FIG. 8

Details for edb's job, "What are the weekly key measures for my products? For: Bobs Cheeses, the week 22- Mar 2004 to 28 - Mar - 2004. This job is COMPLETED.

Details for Job 61126             Download

| Server | Message | Log Date |
|---|---|---|
| DHAHSRV0008.2 | Job Complete | Apr 14 2004 4:44:13 PM |
| DHAHSRV0008.2 | Finished | Apr 14 2004 4:44:03 PM |
| DHAHSRV0008.2 | Emailed edb | Apr 14 2004 4:44:03 PM |
| DHAHSRV0008.2 | Saved | Apr 14 2004 4:43:55 PM |
| DHAHSRV0008.2 | Saving final file | Apr 14 2004 4:43:46 PM |
| DHAHSRV0008.2 | Wrote 55 to file | Apr 14 2004 4:43:36 PM |
| DHAHSRV0008.2 | Step 6 - add in thrifty data | Apr 14 2004 4:43:35 PM |
| DHAHSRV0008.2 | Step 5.5 - add in blank rtns | Apr 14 2004 4:43:35 PM |
| DHAHSRV0008.2 | Step 5 - add in rtn data | Apr 14 2004 4:43:35 PM |
| DHAHSRV0008.2 | Step 4 - add in dates lookup | Apr 14 2004 4:43:35 PM |
| DHAHSRV0008.2 | Step 3 - create results table | Apr 14 2004 4:43:35 PM |
| DHAHSRV0008.2 | Step 2 - create subgroup table | Apr 14 2004 4:43:34 PM |
| DHAHSRV0008.2 | There are 18 rtns in temp_subgroups | Apr 14 2004 4:43:34 PM |
| DHAHSRV0008.2 | Fetching subgroups | Apr 14 2004 4:43:34 PM |
| DHAHSRV0008.2 | Step 1 - check dates | Apr 14 2004 4:43:34 PM |
| DHAHSRV0008.2 | rsummary2 sum_rtn_dc[200404-200404] OK | Apr 14 2004 4:43:34 PM |
| DHAHSRV0008.2 | rsummary2 sum_rtn[200404-200404] OK | Apr 14 2004 4:43:34 PM |
| DHAHSRV0008.2 | Starting on rsummary2 database. | Apr 14 2004 4:43:29 PM |

FIG. 9

New Group  Grop Management

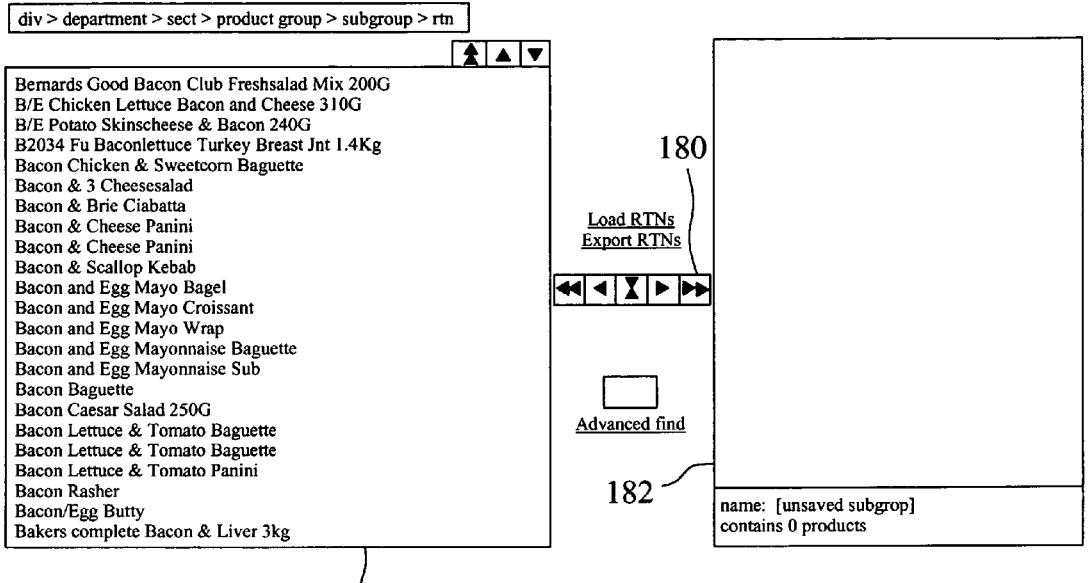

```
div > department > sect > product group > subgroup > rtn
```

Bernards Good Bacon Club Freshsalad Mix 200G
B/E Chicken Lettuce Bacon and Cheese 310G
B/E Potato Skinscheese & Bacon 240G
B2034 Fu Baconlettuce Turkey Breast Jnt 1.4Kg
Bacon Chicken & Sweetcorn Baguette
Bacon & 3 Cheesesalad
Bacon & Brie Ciabatta
Bacon & Cheese Panini
Bacon & Cheese Panini
Bacon & Scallop Kebab
Bacon and Egg Mayo Bagel
Bacon and Egg Mayo Croissant
Bacon and Egg Mayo Wrap
Bacon and Egg Mayonnaise Baguette
Bacon and Egg Mayonnaise Sub
Bacon Baguette
Bacon Caesar Salad 250G
Bacon Lettuce & Tomato Baguette
Bacon Lettuce & Tomato Baguette
Bacon Lettuce & Tomato Panini
Bacon Rasher
Bacon/Egg Butty
Bakers complete Bacon & Liver 3kg 180 — Load RTNs / Export RTNs 182 — Advanced find name: [unsaved subgrop]
contains 0 products

New Group  Grop Management

Save Subgroup

Choose a location to save the subgroup to, then enter details and click 'save'

Save Location

- Acme
  + Public
  + Published
  - edb
    + New Subgroups
    + Old Subgrops
    + QC Model
    + QC Queries

Name:
daves bacon

Description:
nothing special

FIG. 13

New Job   Current Jobs   Job Details   Stockrooms   Recurring Jobs

What are the weekly key measures for my products?
1. Pick Subgroups from the following list
Limited to 1000 RTNs
This is the list of valid Subgroups you may choose from:

Please select between 1 and 10 items from the tree below:

- 📂 Acme
  - + 📁 Public
  - + 📁 Published
  - − 📂 edb
    - − 📂 New Subgroups
      - ☐ 🛒 Bobs Cheeses
      - ☐ 🛒 Bobs bacon
      - ☐ 🛒 daves bacon
    - + 📁 Old Subgroups
    - + 📁 QC Model
    - + 📁 QC Queries
- + 📁 US Products

[ Cancel ]   [ Back ]   [ Next ]

daves bacon

▶

◀

1 item selected

FIG. 14

METHOD FOR PERFORMING RETAIL SALES ANALYSIS

BACKGROUND

The present invention relates to analysis of transaction data generally, and particularly to a method enabling a remotely-located user to perform analysis on a compilation of retail sales data (or other transactional data) via a computer system.

In order to succeed in the ever-changing retail sector, companies desire to maintain a constant watch on market conditions. Demand for products and the prices that consumers are willing to pay for them are continuously changing in response to shifting consumer tastes, activities of competitors, and the general economic climate. To excel in the retail market, whether you are a retailer or a supplier, requires detailed knowledge of the market conditions, and such detailed knowledge can best be obtained from a sophisticated analysis of retail sales data. Accordingly, retailers and their suppliers have begun to amass ever-growing compilations of data from retail transactions so they can keep a close eye on trends that become evident from the sales data.

In order to maximize the benefit from such large and complex compilations of data, there is a need for retailers and their suppliers to be able to access the data and perform highly individualized analysis on the data with minimal delay soon after the data is collected. The present invention fills this need.

SUMMARY

Exemplary embodiments of the present invention provide a method for retailers and other authorized users, such as suppliers, to access and perform sophisticated, highly specialized analysis on retail sales and consumer data from a remote location using an internet or other connected computer. The data that is accessed will typically be a compilation of retail transaction data (collected from EPOS systems, for example), and/or consumer data (which has been collected from frequent-shopper or loyalty cards used by consumers when they shop, for example), and/or other related data that may be collected from time to time by any resource available to those of ordinary skill. Such data may also include, for example and without limitation, demographic data related to a consumer or may include data regarding the promotional status of a product.

In an exemplary embodiment, the system and service provided by the present invention is Web-based such that authorized users may access the service from their remote desktops and have completed analysis projects delivered to them by email, for example, when complete. With such an embodiment, the minimum software that may be required to be installed on the authorized user's computer includes a Web browser (or similar) application and suitable spreadsheet software. Further, in the exemplary embodiment, the projects are generated as spreadsheet based interactive reports (examples of which are described below) that are easy to manipulate for further analysis and presentations. Insights from these projects can lead to better decisions on new product launches, sampling, merchandizing, assortment, distribution, and other sales and marketing priorities. In the exemplary embodiment, the projects are interactive, allowing the user to manipulate and extract information which is specific to the user's particular needs. Of course, while the exemplary embodiment is Web-based, it is certainly within the scope of the present invention that the service be provided in other computer-implemented forms, such as, for example, on a single computer system using dedicated software, or through an intranet or a private network.

The service/system is designed to answer key sales, marketing, category management/planning inquiries and to provide brand/SKU level and customer insights such as, for example:

Which of our last three promotions drove the largest increase in market share?

What is the profile of a loyal Product X customer? What else do they buy?

How are competitor brands/SKUs performing?

What impact/effect did our new product launch have upon the category?

In which stores should we undertake in-store sampling activities?

Such insights can be used to provide, for example, an early indication of the success of a re-launch (i.e., is our launch achieving the expected level of trial and repeat purchase compared with our competitors and the category?); provide robust and detailed consumer information at an individual product level that can be utilized across the business; and review consumer purchasing patters over a time period (such as a year) to plan future marketing activity.

Accordingly, a first aspect of the present invention provides a method for performing an analysis that includes the steps of: providing one or more databases that include transaction and/or consumer data for one or more establishments, where the transaction and/or consumer data includes one or more transaction records associating at least a product identification code with a consumer identification code; formulating an analysis project request via a user interface that is operatively coupled ("operatively coupled" meaning electrically coupled, coupled via a direct or indirect data link, or capable of being coupled via a direct or indirect data link) to a computer system having access to the database; and generating, by the computer system, a project on the transaction and/or consumer data in response to receiving the analysis project request. In a more detailed embodiment, the user interface is resident on a network device operatively coupled to the computer system over a global computer network. In a further detailed embodiment, the network device is a web-enabled device operatively coupled to the computer system over the world-wide-web. In a further detailed embodiment, the method further includes a step of downloading the project over the world-wide-web from the computer system, or a step of transmitting the project over the global computer network from the computer system to a user computer operatively coupled to the global computer network.

In an alternate detailed embodiment of the first aspect of the present invention, the one or more transaction records associates the product identification code with a transaction time and/or transaction date. In a further detailed embodiment, the step of formulating an analysis project request includes the step of selecting, via the user interface, an analysis project from a predefined list of available analysis projects. In yet a further detailed embodiment, the predefined list of available analysis projects includes:

an analysis project providing rates at which a product associated with the product identification code is repeat purchased by the consumer associated with consumer identification code; and/or an analysis project providing rates at which products associated with a vendor identification code are cross-purchased by the consumer associated with the consumer identification code; and/or an analysis project providing a comparison of rates at which a product associated with a first vendor identification code and a product associated with a second vendor identification code are purchased; and/or an analysis project providing a comparison of rates at which a product associated with the product identification code is purchased by consumers in different purchaser categories, where the consumer categories may be defined based upon demographic information associated with the consumer identification code, upon data derived from shopping histories associated with the consumer identification code, and/or upon data associated with price sensitivity associated with the consumer identification code.

In another alternate detailed embodiment of the first aspect of the present invention, the step of formulating an analysis project request includes the step of selecting one or more products from a list of available products.

In another alternate detailed embodiment of the first aspect of the present invention, the method further includes the step of saving at least portions of the analysis project request for re-use in the formulation of future analysis project requests.

In another alternate detailed embodiment of the first aspect of the present invention, the step of generating the project is repeated periodically.

In another alternate detailed embodiment of the first aspect of the present invention, the one or more transaction records associates the product identification code and the consumer identification code with a transaction price.

In another alternate detailed embodiment of the first aspect of the present invention, the method further includes the step of downloading the project from the computer system.

In another alternate detailed embodiment of the first aspect of the present invention, the method further includes the step of collecting at least a portion of the transaction and/or consumer data from shopper loyalty card data.

It is a second aspect of the present invention to provide a method for performing an analysis that includes the steps of: providing one or more databases that include transaction and/or consumer data for one or more establishments, where the transaction and/or consumer data includes one or more transaction records associating at least a product identification code with a consumer identification code; generating, by a computer system having access to the database, a project on the transaction and/or consumer data; and transmitting, by the computer system, the project to a user interface operatively coupled to the computer system. In a more detailed embodiment, the step of generating the project is repeated periodically. In an alternate detailed embodiment, the one or more transaction records associates the product identification code and the consumer identification code with a transaction price. In another alternate detailed embodiment, the project provides rates at which a product associated with the product identification code is repeat purchased by the consumer associated with the consumer identification code. In yet another detailed embodiment, the one or more transaction records associates the product identification code with a vendor identification code and the project provides rates at which products associated with the vendor identification code are cross-purchased by the consumer associated with the consumer identification code. In yet another detailed embodiment, the one or more transaction records associates the product identification code with a vendor identification code and the project provides rates at which a product associated with a first vendor identification code and a product associated with a second vendor identification code are purchased. In yet another detailed embodiment, the one or more transaction records associates the consumer identification code with a purchaser category and the project provides a comparison of rates at which a product associated with the product identification code is purchased by consumers in different purchaser categories.

It is a third aspect of the present invention to provide method for performing an analysis that includes the steps of: providing one or more databases that include transaction data and/or consumer data for one or more establishments; providing a computer system having access to the one or more databases; obtaining from a user, through a computer interface provided by the computer system, parameters for analysis of the transaction and/or consumer data; feeding, by the computer system, the obtained parameters into an executable job file; executing, by the computer system, the executable job file on the transaction and/or consumer data to return results; and presenting to the user a project reflecting the returned results. In a more detailed embodiment, the parameters for analysis include parameters relating to measures of transaction. In a further detailed embodiment, the parameters for analysis include an identification of an analysis format, an identification of retail products for analysis, and an identification of a timeframe for analysis. In yet a further detailed embodiment, the analysis format pertains to:

rates at which consumers make repeat purchases of a product;

rates at which consumers make repeat purchases of a product at a particular type of establishment;

rates at which consumers cross-shop a vendor's products;

rates at which consumers cross-shop a vendor's products at a particular establishment or with a particular type of establishment;

key sales measures in a particular product category;

key sales measures for a vendor's products;

key sales measures for the vendor's products over time;

key sales measures for a particular brand of products over time;

other retail products purchased by consumers of a vendor's products;

locations where a particular product is sold;

locations where a vendor's brand of products is sold;

types of consumers who purchase the vendor's products;

types of consumers who purchase the vendor's products over time; or types of consumers who purchase the vendor's products in a particular establishment or particular type of establishment.

In an alternate detailed embodiment of the third aspect of the present invention, in the obtaining step, the user is prompted to select at least one of the parameters for analysis from a menu containing a plurality of available parameters. In a further detailed embodiment, the user is prompted to select each of the parameters for analysis from the menu.

In another alternate detailed embodiment of the third aspect of the present invention, the computer interface is a web-based interface. In a more detailed embodiment, the method further includes a step of, prior to the obtaining step, verifying that the user has rights to access the computer system.

In another alternate detailed embodiment of the third aspect of the present invention, the feeding step further includes a step of merging the obtained parameters with segments of the executable code to create an executable job file. In a more detailed embodiment, the segments of the executable code with which the obtained parameters are merged is determined, at least in part, from at least one of the obtained parameters.

In another alternate detailed embodiment of the third aspect of the present invention, the project is presented as an interactive report, the method further includes a step of generating the interactive report from the returned results, and the generating step includes the steps of selecting a project template from a plurality of available project templates based upon the analysis format and populating the project template with at least a portion of the returned results.

In another alternate detailed embodiment of the third aspect of the present invention, the transaction and consumer data includes an identity of products purchased, quantity of products purchased, date of purchase, and a code related to the particular purchasing consumer.

In another alternate detailed embodiment of the third aspect of the present invention, the project is presented as a spreadsheet file. In a further detailed embodiment, the method further includes a step of generating the spreadsheet file from the returned results, where the generating step includes the steps of selecting a spreadsheet project template from a plurality of available spreadsheet project templates based upon the obtained parameters and populating the spreadsheet project template with at least a portion of the returned results.

In another alternate detailed embodiment of the third aspect of the present invention, the step of presenting to the user a project reflecting the returned analysis includes the steps of: notifying the user of the availability of the project and providing the user with access to the project after notifying the user and upon the user requesting access to the project. In a further detailed embodiment, the step of providing the user with access to the project includes the step of downloading the project to the user's computer. Alternately, the step of providing the user with access to the project includes the step of providing access to the project to the user via a web-based interface, via a web down load or by receiving the project by email.

It is a fourth aspect of the present invention to provide a computerized system for performing analysis that includes (a) one or more databases having transaction and/or consumer data for one or more retail establishments, where the transaction and/or consumer data includes one or more transaction records associating at least a product identification code with a consumer identification code and (b) a computer system having access to the database, where the computer system is configured to perform the steps of: generating a project on the transaction and/or consumer data; and transmitting the project to a user interface operatively coupled to the computer system. In a more detailed embodiment, the one or more transaction records associates the product identification code and the consumer identification code with a transaction price.

In an alternate detailed embodiment of the fourth aspect of the present invention, the project provides rates at which a product associated with the product identification code is repeat purchased by the consumer associated with the consumer identification code.

In another alternate detailed embodiment of the fourth aspect of the present invention, the one or more databases include one or more product records that associate the product identification code with a vendor identification code; and the project provides rates at which products associated with the vendor identification code are cross-purchased by the consumer associated with the consumer identification code.

In another alternate detailed embodiment of the fourth aspect of the present invention, the one or more databases include one or more product records that associate the product identification code with a vendor identification code; and the project provides rates at which a product associated with a first vendor identification code and a product associated with a second vendor identification code are purchased.

In another alternate detailed embodiment of the fourth aspect of the present invention, the one or more databases include one or more customer records that associate the consumer identification code with a purchaser category; and the project provides a comparison of rates at which a product associated with the product identification code is purchased by consumers in different consumer categories. In a more detailed embodiment, the consumer categories are defined based upon demographic information associated with the consumer identification code. Alternatively, the consumer categories are defined based upon data derived from shopping histories (such as price sensitivity) associated with the consumer identification code.

In another alternate detailed embodiment of the fourth aspect of the present invention, the transaction and/or consumer data is taken from shopper loyalty card data.

BRIEF DESCRIPTION OF THE DRAWINGS

FIG. 2 is an exemplary screenshot asking the user to choose the type of analysis project to be performed;

FIG. 3 is an exemplary screenshot asking the user to select a product group with which to perform the analysis;

FIG. 4 is an exemplary screenshot asking the user to select a time period over which sales data will be analyzed;

FIG. 5 is an exemplary screenshot summarizing the analysis project defined by the user's selections;

FIGS. 7A through 7J illustrate examples of interactive projects produced in an exemplary embodiment of the present invention;

FIG. 8 is an exemplary screen shot showing the project status for a particular user;

FIG. 9 is an exemplary screen shot indicating the history of a completed project;

FIG. 12 is an exemplary screen shot listing individual products within the user's selected group during the creation of a subgroup;

FIG. 13 is an exemplary screen shot prompting the user to enter a name and description for the subgroup being created; and FIG. 14 is an exemplary screen shot showing a newly-created subgroup listed in the file tree.

DETAILED DESCRIPTION

Figure 1:
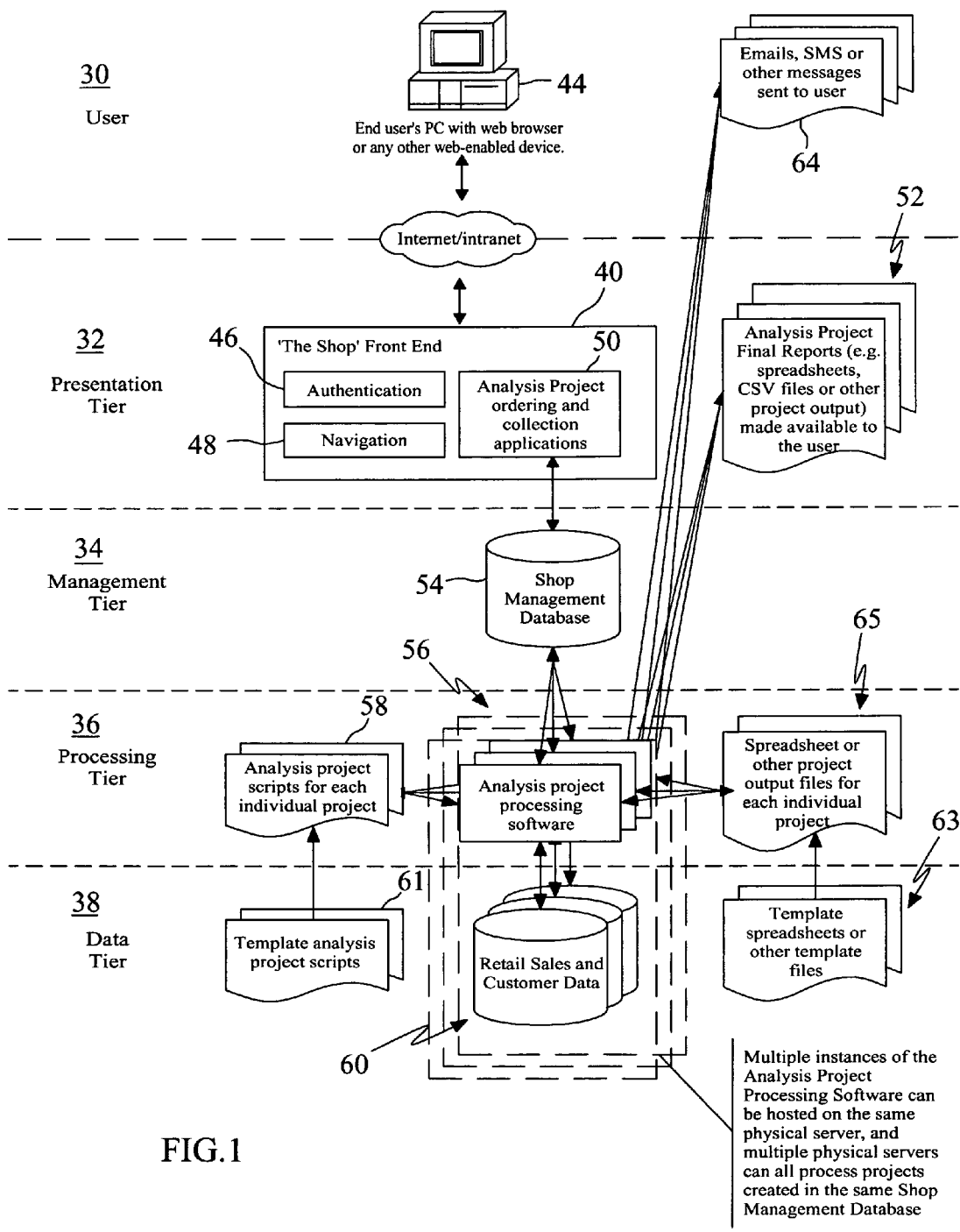
FIG. 1 shows a schematic representation of the system and software configuration in an exemplary embodiment of the present invention.

Generally, the present invention provides a user with substantial flexibility in requesting and generating analysis projects on transaction and/or consumer data that is stored in one or more databases. More specifically, exemplary embodiments of the present invention provide a method for retailers and other authorized users, such as suppliers, to access and perform sophisticated, highly specialized analysis on transaction and/or consumer data, such as retail sales and consumer data, from a remote location using an internet connected computer. The transaction and/or consumer data that is accessed can be, for example and without limitation, a compilation of retail transaction data (collected from EPOS systems, for example) and/or consumer data (which has been collected from frequent-shopper or loyalty cards used by consumers when they shop, for example).

In the exemplary embodiments described below, a service provided by the present invention is a Web-based tool, such that authorized users may access the tool from their remote desktops and have completed projects delivered to them by email, for example, when complete. With such an embodiment, no dedicated software is required to be installed on the authorized user's computer—just a Web browser (or similar) application. Further, in the exemplary embodiment, the projects are generated as spreadsheet based interactive reports (examples of which are described below) that are easy to manipulate for further analysis and presentations. It is within the scope of the present invention, however, that the computerized tool may be resident on a private computer or computer system, where the software is a dedicated software, and it is within the scope of the invention that the tool be provided over an intranet or some other public or private computer or data network (and accessed by appropriate interfaces or tools) as will be appreciated by those of ordinary skill in the art.

The service/system is designed to answer key sales, marketing, category management/planning and provide brand/SKU level insights such as, for example:

Which of our last three promotions drove the largest increase in market share?

What is the profile of a loyal Product X customer? What else do they buy?

How are competitor brands/SKUs performing?

What effect/impact did our new product launch have upon the category?

Which stores should we undertake in-store sampling activities?

Such insights can be used to provide, for example, an early indication of the success of a re-launch (i.e., is our launch achieving the expected level of trial and repeat purchase compared with our competitors and the category?); provide robust and detailed customer information at an individual product level that can be utilized across the business; and review consumer purchasing patterns over a time period (such as a year) to plan future marketing activity.

As used herein, "transaction and/or consumer data" refers to data relating to any, several, or all transactions and/or interactions between a consumer and a business (or any other provider of products as defined below). In an exemplary embodiment, transaction and/or consumer data may include "shopping purchase data" or "shopping history data," which can be information regarding a consumer's shopping history, including the identity of products and quantities thereof that the consumer has purchased. In an exemplary embodiment, transaction and/or consumer data may also include a consumer's demographic data, shopping preferences data, financial data and the like. Other sources for such transaction and/or customer data may include (without limitation) data collected by a financial institution and/or a retail establishment that is tied to a consumer's credit card or similar financial product; data provided voluntarily by the consumer; publicly accessible transactional, consumer, and/or financial data; data compiled by a census organization, consulting service and the like; and data provided by product manufacturers, suppliers and/or distributors.

As used herein, the term "products" includes not only consumer products that can be purchased in a retail store, but also any other product, consumable, service, or thing of value that can be furnished by a business/provider to a consumer.

As used herein, a "consumer" is any individual or group of persons or entities that can be identified and linked to, or associated with transactional data regarding one or more of their transactions. A consumer can be (without limitation): an individual person or customer; can be a household, comprising a group of persons residing at the same address or using the same credit card account, for example; can be a group of individuals or entities have some other relationship to one another (such as belonging to an organization); or can even be a business or governmental entity.

The shopping purchase data can be collected using a unique identification tag or card, commonly known as a "frequent shopper card" or "loyalty card," carried by each consumer. Such cards or tags contain a unique identification code stored by a bar code, magnetic media, or other data storage device and can be read by an electronic device in various manners that are well known to persons skilled in the art. A consumer's shopping purchase data can be associated with the consumer using other consumer identification information (such as a telephone number, store credit card, bank credit card, or checking account number, etc.) in addition to codes from frequent shopper cards. In this manner, the details of a particular transaction can be matched to the consumer's previous transactions, thus facilitating the continuing addition of transactional information to each consumer's record in the database.

As shown in FIG. 1, the system for providing the Web-based service of the exemplary embodiment is segmented into several tiers: the User Tier 30; the Presentation Tier 32; the Management Tier 34; the Processing Tier 36 and the Data Tier 38. The User Tier 30 is essentially the components in which the user accesses the Web-based service, which is provided by a Web server 40 in the Presentation Tier 32. In the User Tier 30 the user accesses the Presentation Tier Web Server 40 over a computer network, such as the Internet 42, using an appropriate network-enabled (Web-enabled) device, such as a personal computer 44. Other network-enabled devices (such as PDAs, cell-phones, etc.) will be apparent to those of ordinary skill in the art. Preferably, the network-enabled device includes a display and an input device (such as a mouse, keyboard, voice-recognition, etc).

The Presentation Tier Web Server 40 provides authentication functions 46, as known by those of ordinary skill, to positively identify the user. The Presentation Tier Web Server 40 also provides navigation functions 48, as known by those of ordinary skill, to control the navigation of the user through the project ordering and other associated applications/functions provided by the Web Server 40 as will be described in further detail below. The Web Server 40 also includes analysis project ordering and parameter collection functions 50 for collecting input data and selections made by the user in setting up the analysis projects described below. Finally, the Presentation Tier also 32 provides access for the user to the interactive projects 52 and other data generated by the Processing Tier as described further below.

The Management Tier provides a management database 54 in communication with the Web Server 40 to store the input data, parameters and other selections made by the user in setting up the analysis projects. This input data, parameters and other selections are made available to analysis project processing software 56 situated within one or more central servers in the Processing Tier 36.

In the exemplary embodiment an extensive permission control system is implemented to control which positively identified and authorized users are permitted access to each of the service/system's features and each part of its data. The permission control system is administered by authorized administrators using an authorization and configuration function of the invention, which stores and retrieves information about named permissions that have been granted and/or denied to users and groups of users in the Shop Management Database 54. The permission control system is used to control whether individual users and defined groups of users can access each part of the service/system. Each significant part, both large and small, of the service/system's functionality has a named permission associated with it. Some permissions are associated with a single part of the service/system's functionality and some are associated with many parts of the service/system's functionality. Users and groups of users are granted access to those permissions as determined appropriate by the administrators. If a user has been granted access to a particular permission, he or she will be able to use the features of the service/system with which that permission is associated. Likewise, if the user has not been granted access to a particular permission, he or she will not be able to use the features of the service/system with which that permission is associated. Some features to which a user does not have access are presented to the user by the Web Server 40 in a visual style which indicates in a commonly-understood way that they are not enabled for the user, and those features do not respond for the user. Other features to which a user does not have access are simply not visible to the user. The authorized administrators can change a user's access to permissions or membership of groups at any time as required by the operators of the service/system.

In the Processing Tier 36, the analysis project processing software 56 constructs executable analysis project scripts 58, which are executed on subsets of the retail sales, consumer and other data resident in a database 60. As will be described further below, the executable analysis project scripts 58 are constructed from appropriate script templates 61 obtained from the Data Tier 38, where the script templates 61 are loaded with the input data, parameters and other selections input by the user. Multiple instances of the analysis project processing software 56 can be hosted on the same physical server, and multiple physical servers can all process projects created in the same Shop Management Database 54.

The transaction and/or consumer data resident in the database 60 includes a plurality of record types, where a primary record type is the retail sales or "Transactions" record type. For each Transactions record, there is provided, in the exemplary embodiment: a code identifying the SKU/product(s) purchased by the consumer for the transaction; a code identifying the particular transaction or 'basket'; a code identifying the consumer for the which the transaction is attributed; a code identifying the store in which the transaction occurred; data concerning the quantity of products purchased and the amount spent; data concerning the date, time, etc. of the purchase; and any other data or codes, such as a code indicating a geographical region for the purchase, as could be useful to generate projects based upon such transactional data.

The code in the Transaction record identifying the SKU/product is used as a lookup to a "Products" record type, where for each Products record, there is provided, in the exemplary embodiment: product grouping or categorization data or codes; product data; manufacturer or supplier data or codes; and any other data or codes, such as suggested retail price data, as could be useful to generate projects based upon a combination of transaction, consumer and product data.

The code in the Transaction record identifying the consumer for the transaction is used as a lookup to a "Households" record type, where for each Households record, there may be provided, in the exemplary embodiment data and/or codes pertaining to the consumer's demographics, geo-demographics, purchase recently, purchase frequency, spend, loyalty, product purchase history, shopping history, shopping preferences, and any other data or codes as could be useful to generate projects based upon a combination of transaction and consumer data.

The code in the Transaction record identifying the store in which the transaction occurred is used as a lookup to a "Stores" record type, where for each Stores record, there is provided, in the exemplary embodiment: store name data; store location data or codes; and any other data or codes as could be useful to generate projects based upon a combination of transaction, consumer and store data.

As will be appreciated by those of ordinary skill, the above-described database record structures are only exemplary in nature and that unlimited combinations of database records and hierarchies are available to cross-reference transaction information, product information, consumer information, store information, location information, timing information, and any other appropriate information with one another. Additionally, one of ordinary skill will appreciate that the invention is not limited for use with retail store transactions and that the invention can be used with most (if not all) types of transactions (such as financial/banking transactions, insurance transactions, service transactions, telecoms etc.), where the database structures and hierarchies may be adapted for generating projects on such alternate transaction and/or consumer data.

Referring again to the system diagram of FIG. 1, a user logs into the Web server 40 via a personal computer 44 or other web-enabled device from a remote location, enters and/or selects the parameters defining the user's desired analysis project, and then submits the analysis project for processing. Once the user has submitted an analysis project order, the actual processing of the project takes place at the Management, Processing and Data Tiers 34, 36 & 38. Data returned by the analysis project processing software 56 will be inserted into an interactive spreadsheet template file 63 to generate an interactive project 65, where the results may be presented in a format that is easily interpreted by the user. The particular format of the interactive spreadsheet 65 will differ depending on what type of analysis project is being performed, and the appropriate format will be specified by the script template 61 that was used to encode the analysis project on the front end, as described above. Users are able to specify that they wish to be notified once the project has completed—notification can be made by a messaging service such as e-mail or SMS 64. Thus, the data compilation and processing are both managed by a central system server(s), and the individual user can design a customized analysis project tailored to the user's business needs.

FIGS. 2-4 provide screen shots illustrating example menus/forms presented to the user by the Web Server 40 in an initial step of ordering an analysis project. Generally, the entire process of the method is commenced by the user, who can log into Web Server 40 from a remote location. The user first selects the type of analysis project they wish to order. The user may then be prompted additional times to select the parameters that are required in order to construct their desired analysis project.

As shown in FIG. 2, after the user logs into the Web Server 40 through the authentication function 46, an initial screen provided by the Web Server, provides a menu 66 of selectable analysis projects that may be performed. As discussed above, the permission control system limits the menu of the available analysis projects that the user has been granted permission to order (i.e., the available analysis projects the user has paid for). Available analysis projects can be arranged in a graphical hierarchy to make navigation of the ordering process easier. FIG. 2 shows an example of this where the available analysis projects are divided into three categories: Customer Insight Projects (Standard), Customer Insight Projects (Regional), and Extracts. The first two categories, both labeled Consumer Insight Projects, contain many of the same analysis projects, with the first category generating projects drawn from the entire compilation of sales data, while the second category generates projects drawn from sales data specific to a specified geographic region.

Once the user has selected a type of analysis project to run, more screens may be presented, if necessary, that prompt the user to provide information and set data filters that ensures the analysis is performed on the particular set of data that the user is interested in. Project-specific information selected, entered and otherwise provided by the user is captured and stored within the Management Database 54 in the Management Tier 34. In the present example, the user has selected the analysis project entitled: "What are the weekly key measures for my products?" 67. Thus additional screens are provided to the user for the selection of the products and weeks for which to perform the analysis.

For example, as shown in FIG. 3, in a next step the user is prompted to select a product group with which to perform the analysis. A product group defines precisely the products for which sales data will be analyzed. The product groups may be predefined or may be defined by the user (as will be described below). As shown in FIG. 3, the product groups and categories may be presented to the user in a hierarchy of folders 68, from which to select one or more product groups. In the example shown in FIG. 3, the product group selected is a user-defined (the user being "edb") group labeled "Eds Cheeses" 70.

Following selection of a product group, in this example the user is then presented with a screen such as the one shown in FIG. 4, which asks the user to select a time period, from a menu of selectable time periods 72, over which sales data will be analyzed. As seen in FIG. 4, the exemplary embodiment presents time periods consisting of one or more weeks. In this example, the user selects the time period labeled, "The week 22-Mar.-2004 to 28-Mar.-2004" 74.

Once the user has made the necessary selections (which in this example are project type, product group, and time period), the job or analysis project request is complete. The user is then presented with a screen such as the one shown in FIG. 5, which succinctly summarizes the analysis project defined by the user's selections. Once the user verifies that this analysis project description is correct, the user can submit the project for processing by clicking on or activating the "Finish" button 76, as instructed.

Once the user submits the analysis project for processing, the project is encoded in a way that incorporates the user-selected parameters into an executable script written in an appropriate commercially available scripting language. Some suitable scripting languages, include, without limitation, VBScript, JavaScript, Perl, Korn Shell and the like.

Specifically, referring again to FIG. 1, once a project has been constructed and submitted for processing utilizing the project ordering and parameter collection functions 50 on the Web Server 40, the Web Server inserts the job parameter identifications and associated data into the Shop Management Database 54. The Shop Management Database 54 contains a log of the various analysis projects that have been requested by each user, and it maintains a record containing the selected values entered by the user defining each project. When a project is ready for execution, the Analysis Project Processing Software 56 resident on the central server(s) retrieves the selected parameters from the Shop Management Database 54 and begins creating the analysis project script 58 for the particular analysis by inserting those parameters into a new script file template 61.

The analysis project script, in the exemplary embodiment, is the package of executable code that is run on the retail sales, consumer and other data in database 60 in order to carry out a particular analysis project that has been requested by the user. The analysis project script 58 is constructed by the Analysis Project Processing Software 56 using a combination of the following:

project type specific: code that is specific to the type of analysis project that has been ordered (e.g., the queries that are needed to perform the requested analysis project)

project specific: code that is specific to the particular analysis project order (e.g., username, products of interest, weeks of interest, etc.)

generic: code that is common to all analysis jobs

The Data Tier 38 of the architecture contains the project-type specific code and generic code that will be retrieved by the Analysis Project Processing Software 56 and added to the analysis project script 58, while the project specific code is retrieved from the Shop Management Database 54 as described above.

In the next step, the analysis project script 58 is executed on the transaction and/or consumer data in database 60, or a subset thereof. The script 58 queries the relevant records in the database 60 and returns collected data to answer the questions posed by the user's analysis project. In this search/query operation, the script 58 will look for transactional, consumer and other data that matches the search parameters (filters) entered by the user, which may include the type of sales information sought, the product group(s) to be searched, and the timeframe(s) to be searched, as described in the above example.

Other filters (in addition to product groups and timeframe as used in the present example) falling within the scope of the present invention include, without limitation: any distinct period of time, multiple periods of time (including week, day, hour), store, geography (region), individual product, and groups of consumers with particular consumer/demographic/behavioral attributes. Product group filters can be based upon, for example and without limitation: category, price, brand, variant, pack size, flavor, and the like; or any combination of thereof.

Following execution of the analysis project script, the data returned by the search operation will be inserted into an interactive spreadsheet template file 63 to generate an interactive project 65, where the results may be presented in a format that is easily interpreted by the user. The particular format of the interactive spreadsheet 65 will differ depending on what type of analysis project is being performed, and the appropriate format will be specified by the script template 61 that was used to encode the analysis project on the front end, as described above. For each type of analysis project, the script template 61 utilized is associated with a corresponding spreadsheet template that is formatted in an appropriate way to receive and present the data returned by the search/query for that analysis project. For use with the present invention, any suitable spreadsheet product may be used to generate these projects such as Microsoft Excel, Lotus 1-2-3, StarOffice Calc, OpenOffice.org Calc, and the like. It is also within the scope of the invention, and it will be appreciated by those of ordinary skill, that the projects can be generated in other suitable formats, and using other suitable tools (whether offthe-shelf, custom, or a combination of both) for generating the types of projects described herein.

Figure 6:
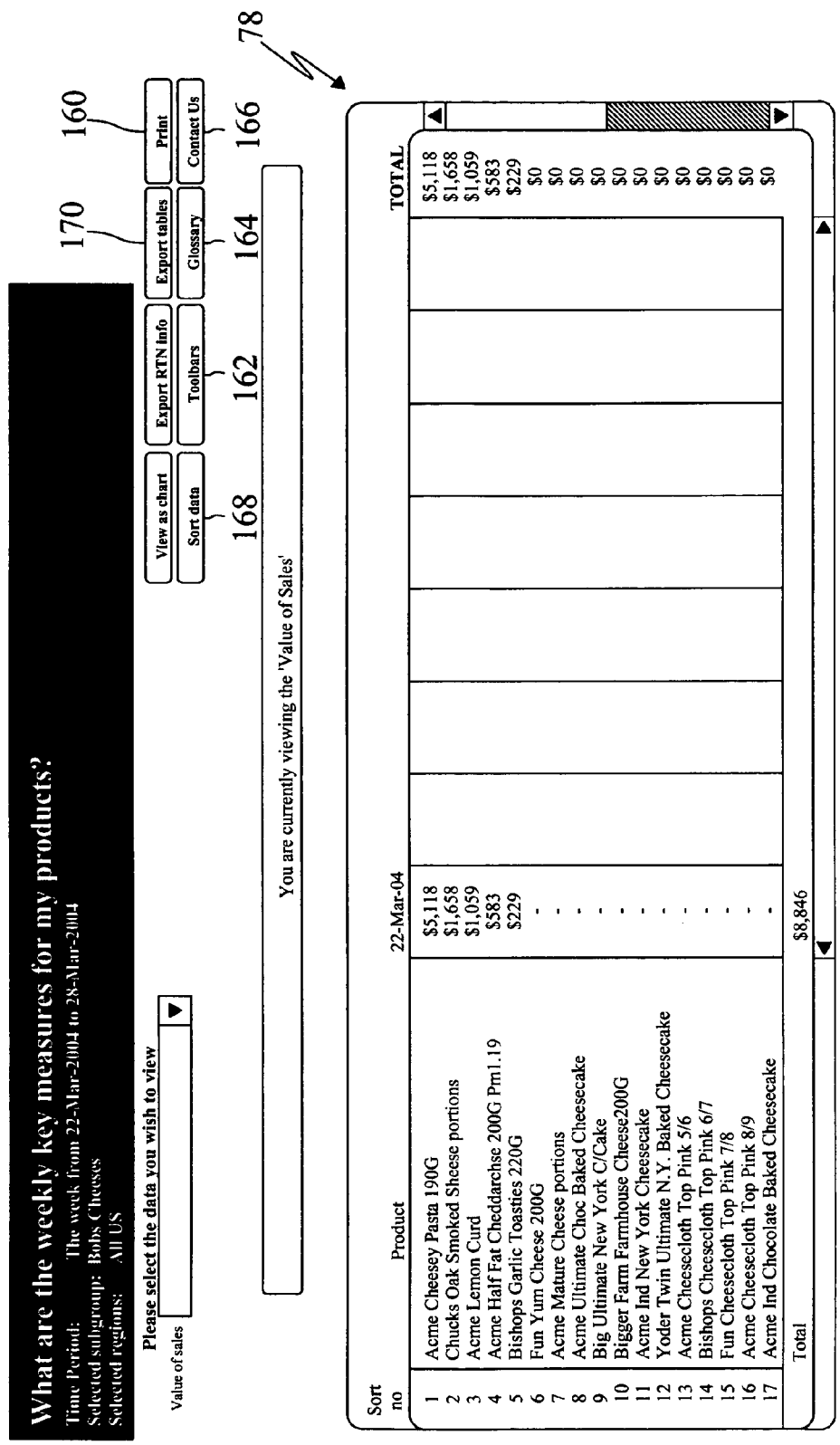
FIG. 6 is an example interactive project for the example project generated above from FIGS. 2-5.

After the analysis data has been imported into an interactive spreadsheet file, the finished analysis project, as embodied in the spreadsheet file, is published/transmitted to the user who requested the project. The appearance and content of the final project will depend on the type of analysis project. FIG. 6, for example, provides an illustration of the "What are the weekly key measures for my products?" project 78 as constructed above in FIGS. 2-5 on product subgroup "Eds Cheeses," analyzing sales data for the week from Mar. 22, 2004 to Mar. 28, 2004. See the FIG. 7H and the accompanying description below for a discussion on the structure and layout of this type of project.

Figure 7A:
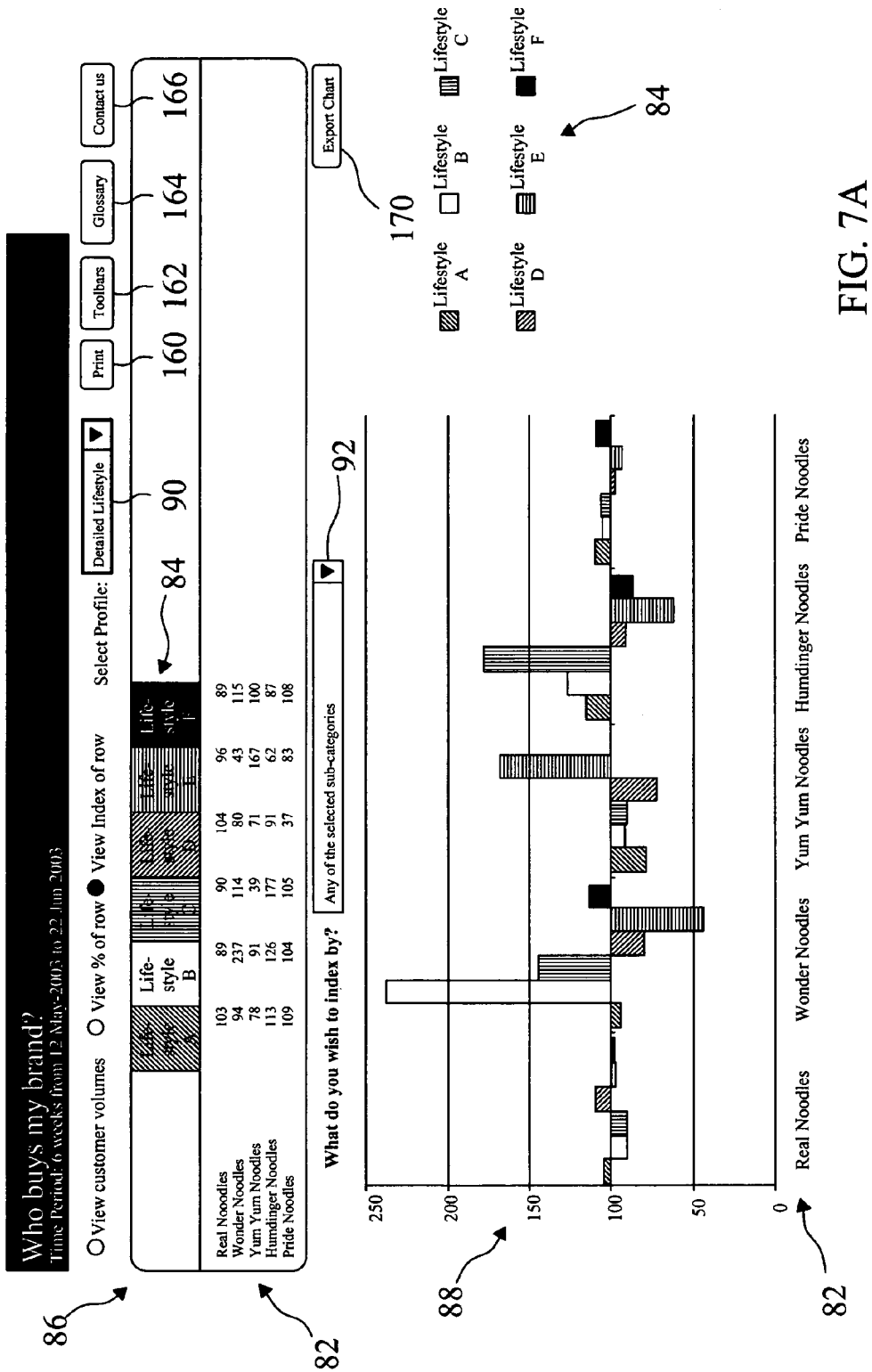

As shown in FIG. 7A, another example interactive project 80 provided by the exemplary embodiment is titled, "Who buys my brand?" As shown in this example project, a number of products 82 are provided along with an indication of the type of consumer 84 that has bought these products over a given period of time. The purchases of such products can be segmented based upon the "Detailed Lifestyle" of the consumers as shown in the present example, where the consumers' lifestyle are segmented into the following categories: "Lifestyle A," "Lifestyle B," "Lifestyle C," "Lifestyle D," "Lifestyle E," and "Lifestyle F." Indications of these Detailed Lifestyle categories may be provided in the consumers' records in the database 60 for each consumer record. Such categorization may be determined by any number of methods. In an exemplary embodiment, consumers' purchases are analyzed over time to determine the types of products that are most commonly purchased by the consumer (where such products may be tagged with category of the type of consumer will typically purchase it—i.e., whole-wheat bread products may be tagged as a category of product that is purchased by "health-conscious" consumers, caviar may be tagged as a category of product that is purchased by "affluent" consumers, etc.). Depending upon the purchase history, the consumers can be profiled or categorized in one of the above-labeled categories ("Lifestyle A-F"). Alternatively, consumers may be profiled or categorized based upon other or additional information such as demographic information or information that the consumer provides (such as by filling out questionnaires). Other consumer profiles/segmentations in the exemplary embodiment may include without limitation: demographics, age, shopper frequency, locality, geo-demographics, and data obtained directly from the consumer or derived from their address or purchase behaviors.

The interactive display of the results is shown in this example in two ways: a tabular format 86 and a bar-graph format 88. In this interactive project, the user is permitted to select a different consumer profile via pull-down menu 90 so that the results may be re-tabulated and displayed by the project based upon another selected profile, and the user is also permitted to select an index via pull-down menu 92 to limit the project display to only certain of the consumer categories.

Figure 7B:
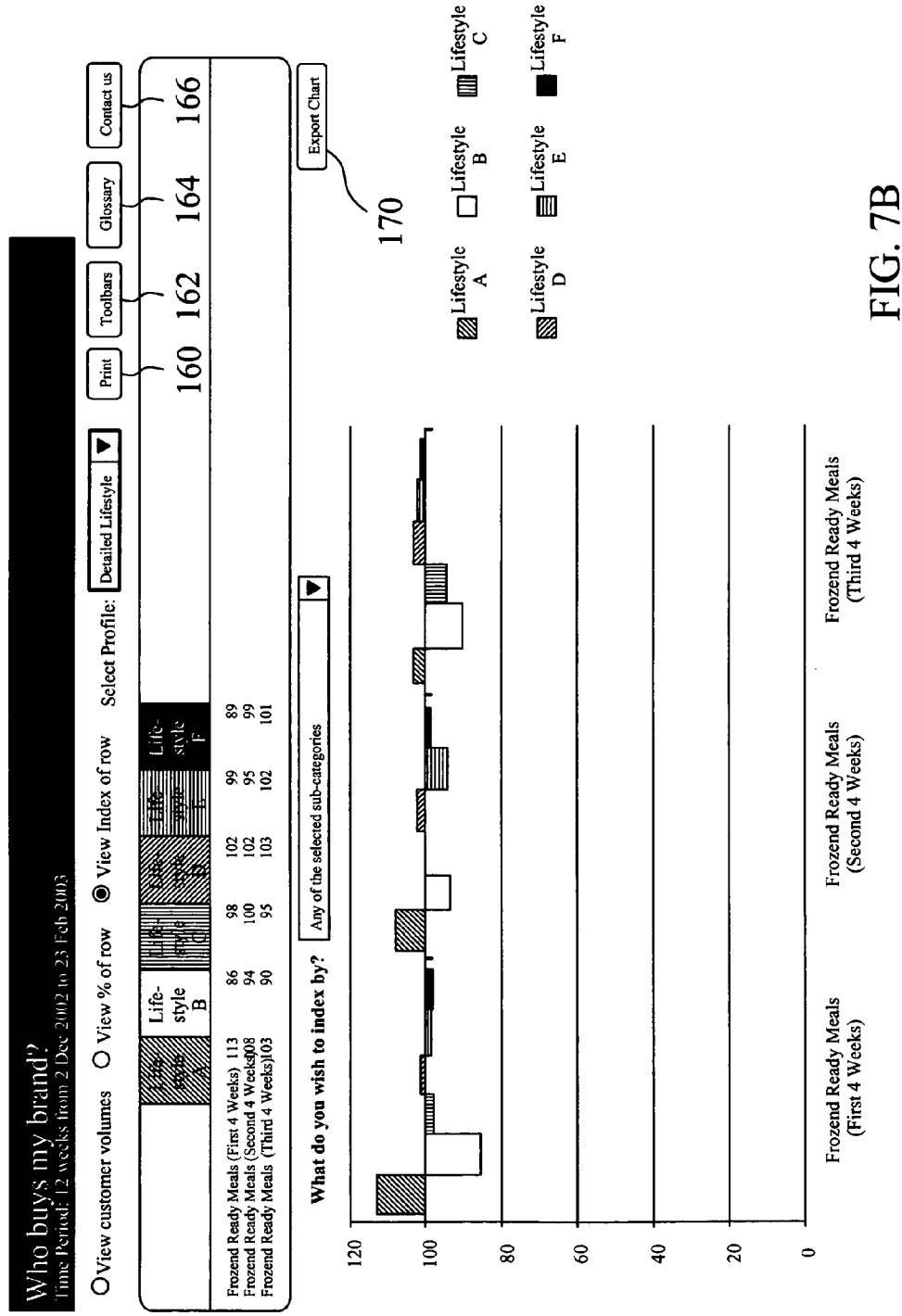

As shown in FIG. 7B, a similar project 94 as discussed above is titled, "Who buys my brand over time?" In this project, sales of one or more products are compared for different time periods, such as: "First 4 Weeks," "Second 4 Weeks" and "Third 4 Weeks." As in the above example project, such sales are broken down by the profile/category of consumer that purchased the product in these three time periods. Such an analysis/project allows the user to determine sales figures before, during and after a special promotional period, for example.

Figure 7C:
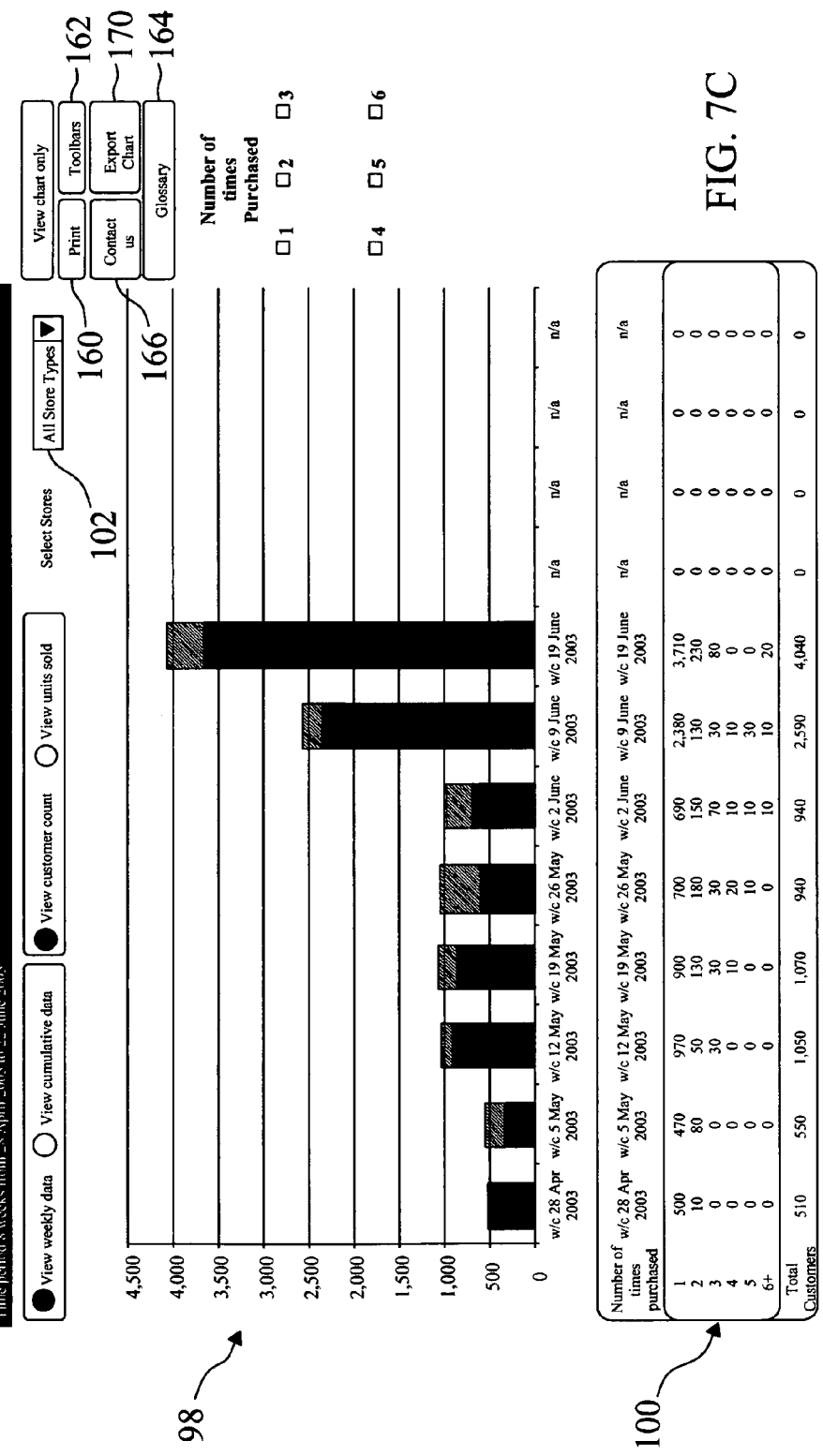

As shown in FIG. 7C, another interactive project 96 entitled, "How are people repeat purchasing my product?," allows users to evaluate repeat rates of new and existing products versus competitor products or versus the category of product. The project allows the user to study periodic (e.g., weekly) data or to study the cumulative effect over a period of time. For a given product, the amount of times that the product has been repeat-purchased by consumers is displayed for a respective plurality of weeks (or any selected time period) in both bar-graph 98 and tabular forms 100. In the bar-graph 98, if the product is purchased by the consumer for the first time (number of time purchased=1), it is shown in a first color; if the product is purchased by the consumer for the second time (number of times purchased=2), it is shown in a different color; and so on, where the last color is for products purchased 6 or more times. The interactive project allows the user to switch between weekly data views (as shown) and cumulative data views; and between views by consumer count (as shown) and units sold. Finally, a pull-down menu 102 allows the user to filter the project through various selectable store types.

As shown in FIG. 7D, another interactive project 104 entitled, "What other products are found in my consumer's baskets?" allows users to evaluate which products are bought at the same time as a specified product, or group of products. The outputted project looks at basket level data as well as consumer data and the user can look at the overall retailer basket as well as defining baskets containing the selected product and a second specified product area.

As shown in FIG. 7E, another interactive project 112 entitled, "Where is my brand sold (product level)?" allows users to evaluate consumers that are buying their products and competitors' products in total and in top and bottom performing stores. The user can also look at the full store list if desired. The outputted project can be used to see how a product is performing across different stores. Insights from this project can lead to better decisions on new product launches, sampling, merchandising, assortment, distribution, and other sales and marketing priorities. As shown in this project, three tables are provided: Sales Total 114, Sales by Store Type 116 and Sales by Store 118. In each table, the first column presents the total number of consumers buying a particular selected brand of product; the second column presents the total number of units of the brand that have been purchased; the third column provides the value of these sales; the fourth column provides the percentage of purchases by consumers in a given row (store type or store) versus all consumers; the fifth column provides the percentage of units sold by consumers in the given row versus all consumers; the sixth column provides the percentage of the value of these sales for the given row; the seventh column provides the consumer penetration percentage; and the last column provides the average amount spent by each consumer on the given brand.

Figure 7F:
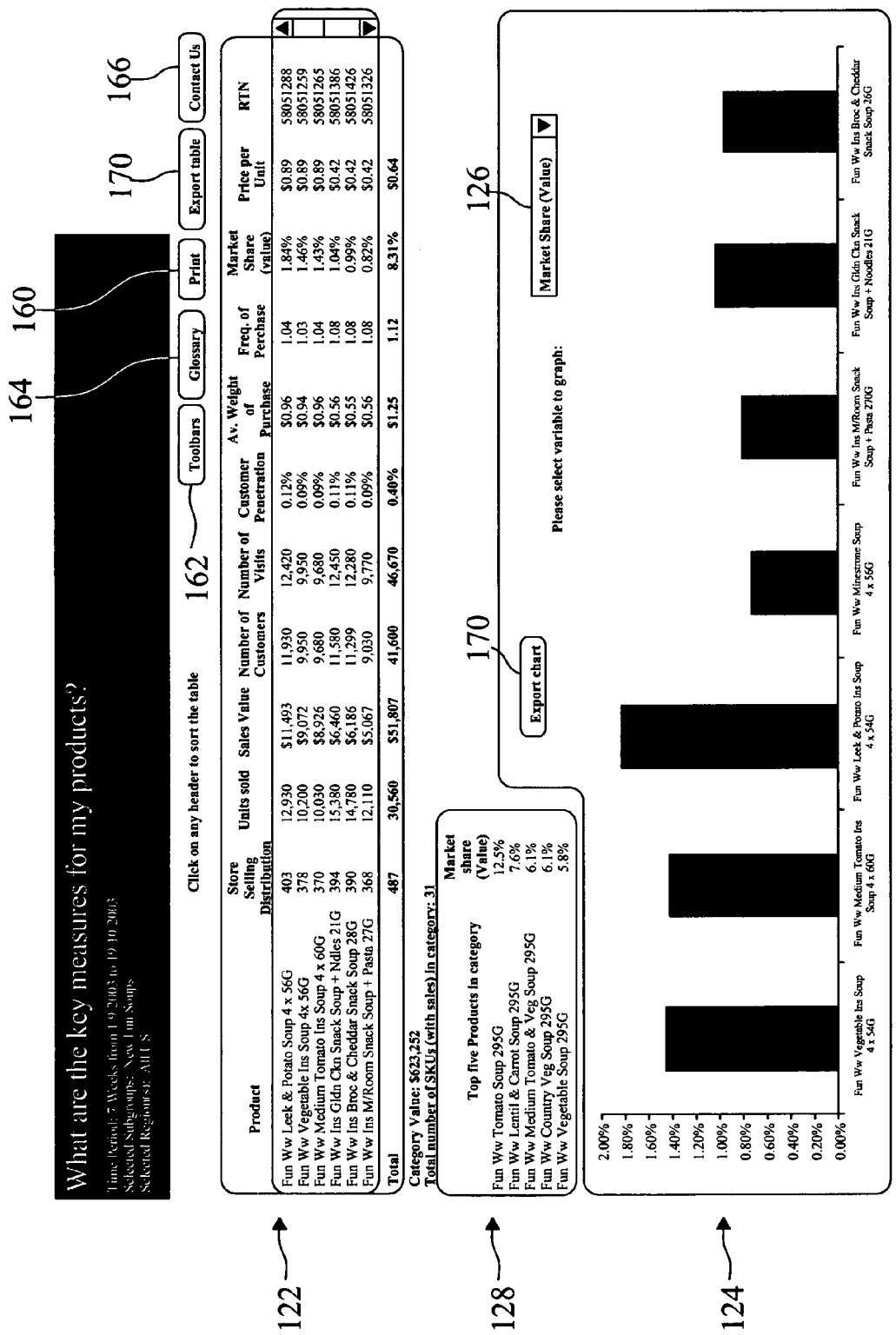

As shown in FIG. 7F, another interactive project 120 entitled, "What are the key measures for my products?," allows users to evaluate key consumer and sales measures for their products and competitor's products. The measures that are included in the project are, in a given time period: store selling distribution, number of units sold, sales value for the units sold, number of consumers purchasing the selected products, number of visits of all consumers purchasing the selected products, consumer penetration, average weight of each purchase of the selected products, frequency of purchases, market share, and price per unit. As shown in FIG. 7F the interactive project provides such key measures in both tabular form 122 and bar-graph form 124. A pull-down menu 126 allows the user to select which key measure that is to be illustrated in the bar-graph display 124. A sub-table 128 provides another view of specific key measures. FIGS. 7H and 7I, described below, provide alternate examples of key measures interactive projects.

Figure 7G:
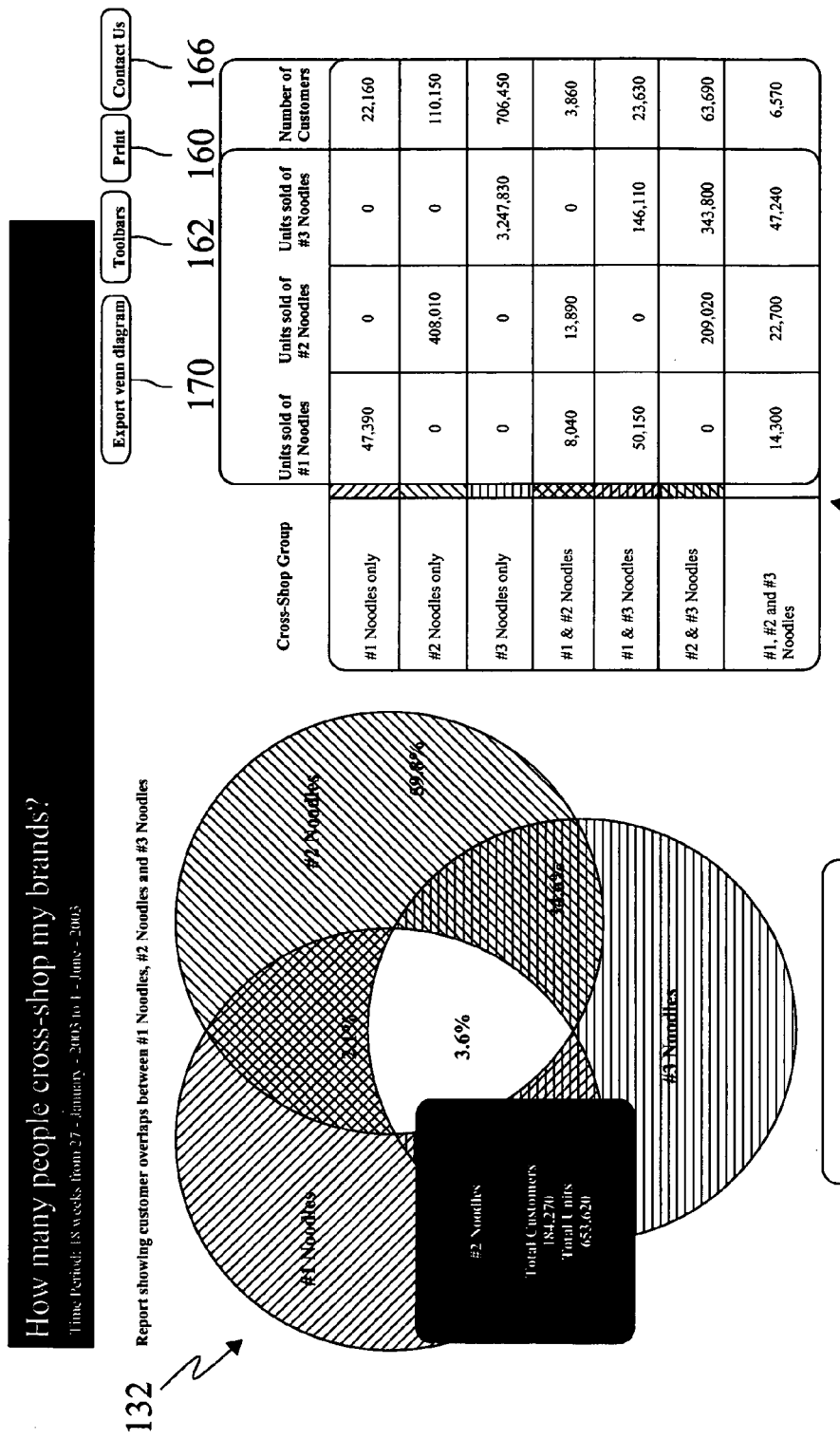
Figure 7H:
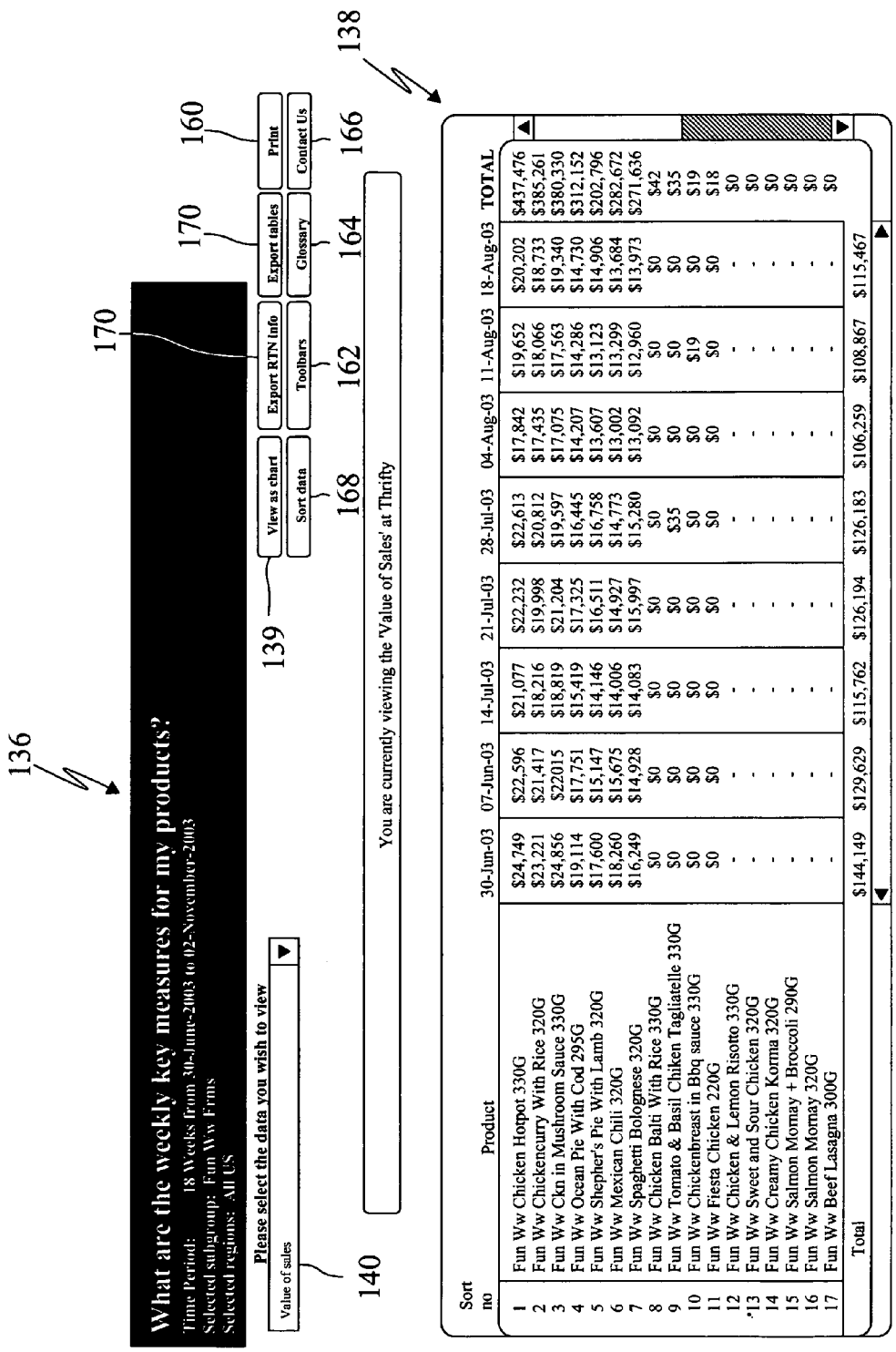

As shown in FIG. 7G, another interactive project 130 entitled, "How many people cross-shop my products?," allows users to evaluate how consumers cross-shop across different products/SKUs, brands, or categories. Both the volumes of consumers and the number of units these consumers account for are included in the project. The project can be used for new product development/listing, for example. Another area where the project can be used is to identify whether link saves or multi-pack formats are appropriate across different SKUs/product areas. The cross-shopping statistics are presented by venn diagram 132 and by an intersection table 134.

As shown in FIG. 7H, the interactive project 136 entitled, "What are the weekly key measures for my products?," provides an overview of brand performance measures for a user defined product group. The project is designed to be interactive, allowing the user to manipulate and extract information which is specific to the user's particular needs. The project can provide:

Sales value, units, consumer and visit numbers
Number of consumers, average weight of purchase (by value or units)
% Share of Subgroup and Customer Penetration into all of the selected retail outlets These measures can also be viewed in different ways such as:
A table 138 cross-tabbing products by week
A bar chart (not shown), selectable by activating the View as Chart button 139, enabling the user to view the data by individual product or week
An ability to drill down by week or at SKU level
An ability to sort alphabetically or by selected measure A pull-down menu 140 allows the user to select the format and specificity of the display. In FIG. 7H, the values of sales for the selected products are shown in tabular form on a week-by-week basis.

As shown in FIG. 7I, another interactive project 142 entitled, "What are the key measures for my products over time?", provides an interactive project that illustrates a comparison of two time periods for a specific group of products. The project 142 contains dynamic text in a text box 144 that provides an explanation of changes and which key measures are driving the changes. The project provides a quick 'health check' of the performance of selected products. The project can be used to easily understand whether the market share is increasing or whether the number of units sold is decreasing. This is an ideal project for undertaking month-on-month or year-on-year analysis. As shown in FIG. 7I, a pull-down menu 146 allows the user to select the specificity of the project and the selected measures are shown both in tabular form 148, comparing the most recent period to the previous period and including a comparison index, and bar-graph form 150.

Figure 7J:
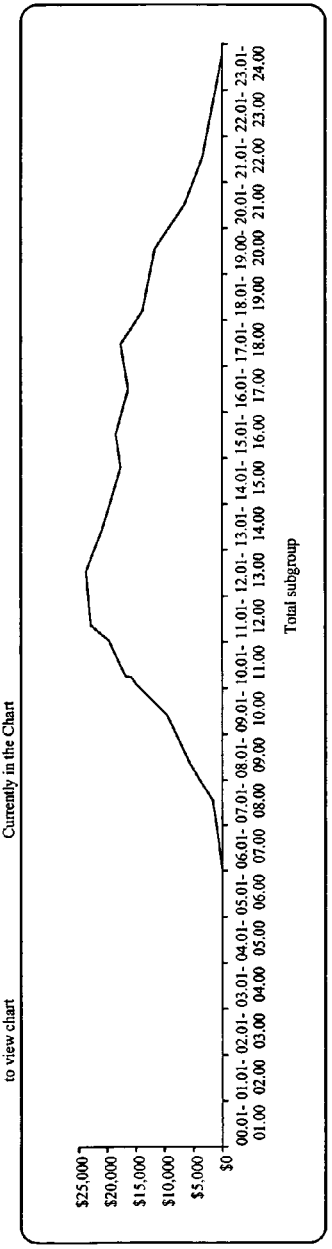

As shown in FIG. 7J, another interactive project 152 entitled, "How does my brand sell over time?", breaks down consumers, sales and visits by hour, day and weekend vs. weekday. The project 152 provides information that can be used to understand out-of-stock issues and identify demand during the day, weekday and weekend to help with supply chain management. The project provides a selected key measure for a product or a group of products in tabular form 154 and in line-graph form 156. A button 158 provides a menu for the user to change the key measure(s) being displayed upon activation. The graph 156 within the project can display several SKU products simultaneously (different line colors) and can include the entire subgroup of products (as shown in the example project of FIG. 7J).

In many or all of the above example projects shown in FIGS. 7A-7J, buttons/icons are provided that allow the user to start support functions/programs, such as: Print 160; Toolbars 162; Glossary 164; Contact Us 166; Sort 168; and Export Chart/Table/Diagram/Data 170.

At any time, the user can log into the system and view the status of an analysis project that has been submitted for processing. FIG. 8 is an exemplary screen view showing the project status for a particular user. In this example, the screen shows the projects pending at 4:36:10 pm on Apr. 14, 2004 for the username "edb." The list contains two projects, listing the job number, username, project status, and project description for each. In this example, both listed projects have a status of "PROCESSING." FIG. 9 shows a status screen indicating the history of a completed project, showing the various events and steps performed during the processing of that project, and the time at which each event or step was performed.

Figure 10:
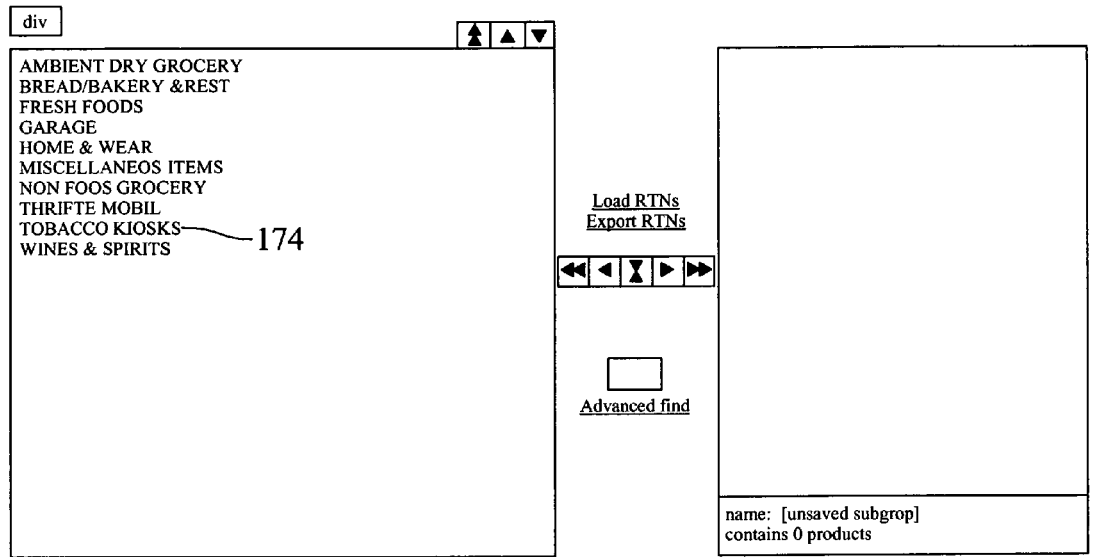
FIG. 10 is an exemplary screen shot for the beginning of the subgroup creation process.
Figure 11:
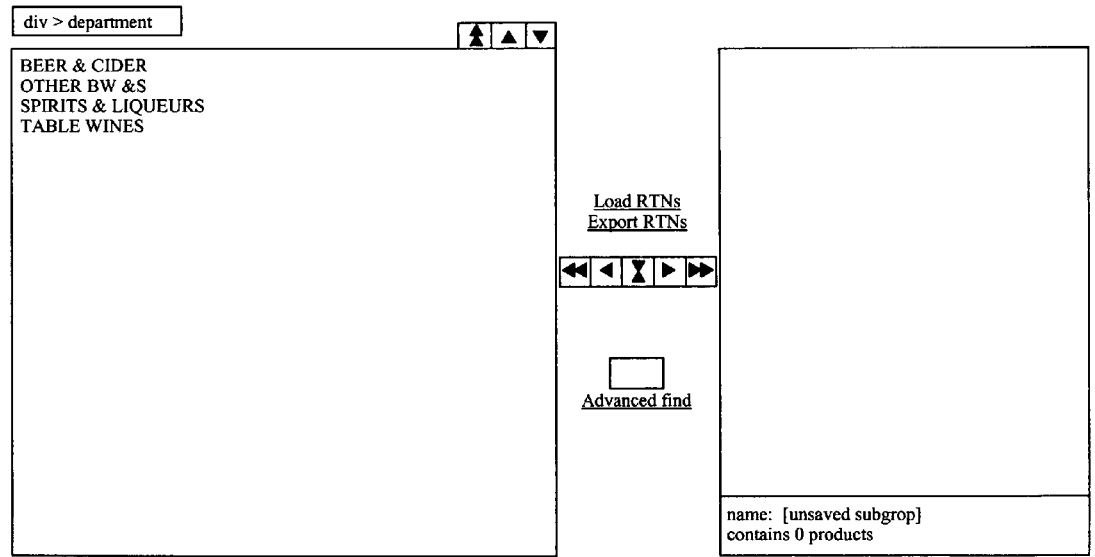
FIG. 11 is an exemplary screen shot listing several narrower categories of products that fall under the broad category previously selected by the user during the creation of a subgroup.

As discussed in the above example process shown in FIG. 3, the products for which sales data will be analyzed are selected from a list of product groups. The user can create a product group by identifying which individual products they wish to be grouped together. FIG. 10 shows a screen shot for the beginning of the product group creation process. In the left box 172, various broad categories of merchandise are listed, and the user chooses the appropriate merchandise category for the products he wishes to group together. In this example, the user selects the "Wines & Spirits" category 174. The next screen, shown in FIG. 11, lists several narrower categories in box 176 of products that fall under the broad "Wines & Spirits" category previously selected by the user.

After the user makes this further selection of the narrower product category, a screen like the one in FIG. 12 is provided, listing individual products in the selected category. In this example, the user has selected "Bacon Products", and the box 178 lists all available bacon products predefined to that category. From this product list in the box 178, the user can choose individual products to add to his/her customized product group. The user clicks on a desired product to highlight it, then the user clicks the "add" button 180, which causes the highlighted product to appear in the right box 182, thus indicating that it has been selected for inclusion in the user's customized subgroup. This selection process can be repeated until the customized subgroup contains all the individual products that user wishes to include. The user is then presented with the Save Product Group screen, shown in FIG. 13, which prompts the user to enter a name and description for the subgroup being created. In this example, the user names the subgroup, "david's bacon." Once the subgroup has been created, it will be listed in the folder structure and may be selected for performing an analysis project, as seen in FIG. 14.

Following from the above description and invention summaries, it should be apparent to those of ordinary skill in the art that, while the systems and processes herein described constitute exemplary embodiments of the present invention, it is to be understood that the invention is not limited to these precise systems and processes and that changes may be made therein without departing from the scope of the invention as defined by the claims. Additionally, it is to be understood that the invention is defined by the claims and it is not intended that any limitations or elements describing the exemplary embodiments set forth herein are to be incorporated into the meaning of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method for performing a transaction-related analysis, comprising the steps of:
    providing one or more computerized databases that include at least one of transaction and consumer data for one or more establishments, the at least one of transaction and consumer data including one or more transaction records associating at least a product identification code with a consumer identification code;
    formulating an analysis project request via a user interface that is operatively coupled to a computer system having access to the database; and
    generating, by the computer system, an analysis project on the at least one of transaction and consumer data in response to receiving the analysis project request;
    wherein the step of formulating the analysis project request includes the steps of,
    selecting, via the user interface, the analysis project from a predefined list of available analysis projects;
    obtaining, by the computer system a template of executable database analysis scripts based, at least in part, upon the selected analysis project;
    selecting, via the user interface, one or more analysis parameters associated with the analysis project; and
    loading, by the computer system, the selected one or more analysis parameters with the template of executable database analysis scripts to construct an executable analysis project script to be executed against on the at least one of transaction and consumer data in the generating step;
    wherein the step of selecting, via the user interface, one or more analysis parameters associated with the analysis project includes the step of selecting one or more products from a list of available products;
    wherein the step of selecting, via the user interface, one or more analysis parameters associated with the analysis project includes the step of selecting a time frame in which to limit the analysis of the at least one of transaction and consumer data; and
    wherein the method further includes the step of executing, by the computer system, the executable analysis project script on the at least one of transaction and consumer data to produce result data.

2. The method of claim 1, wherein the user interface is resident on a network device operatively coupled to the computer system over a global computer network.

3. The method of claim 2, wherein the network device is a web-enabled device operatively coupled to the computer system over the world-wide-web.

4. The method of claim 3, further comprising a step taken from a group consisting of:
    downloading the result data over the world-wide-web from the computer system; and
    transmitting the result data over the global computer network from the computer system to a user computer operatively coupled to the global computer network.

5. The method of claim 1, wherein the one or more transaction records associates the product identification code with at least one of a transaction time and a transaction date.

6. The method of claim 1, wherein the predefined list of available analysis projects includes an analysis project providing rates at which a product associated with the product identification code is repeat purchased by the consumer associated with the consumer identification code.

7. The method of claim 1, wherein:
    the one or more transaction records associates the product identification code with a vendor identification code; and
    the predefined list of available projects includes an analysis project providing rates at which products associated with the vendor identification code are cross-purchased by the consumer associated with the consumer identification code.

8. The method of claim 1, wherein:
    the one or more transaction records associates the product identification code with a vendor identification code; and
    the predefined list of available projects includes an analysis project providing a comparison of rates at which a product associated with a first vendor identification code and a product associated with a second vendor identification code are purchased.

9. The method of claim 1, wherein:
    the one or more transaction records associates the consumer identification code with a purchaser category; and
    the predefined list of available projects includes an analysis project providing a comparison of rates at which a product associated with the product identification code is purchased by consumers in different consumer categories.

10. The method of claim 9, wherein the consumer categories are defined based upon demographic information associated with the consumer identification code.

11. The method of claim 9, wherein the consumer categories are defined based upon data derived from shopping histories associated with the consumer identification code.

12. The method of claim 11, wherein the consumer categories are defined based upon data associated with price sensitivity associated with the consumer identification code.

13. The method of claim 1, wherein the step of selecting one or more products from a list of available products is preceded by a step of selecting a product category from a list of available product categories.

14. The method of claim 1, further comprising the step of saving at least portions of the analysis project request for re-use in the formulation of future analysis project requests.

15. The method of claim 1, wherein the step of generating the analysis project is repeated periodically.

16. The method of claim 1, wherein the one or more transaction records associates the product identification code and the consumer identification code with a transaction price.

17. The method of claim 1, further comprising the step of downloading, via the user interface, the result data from the computer system.

18. The method of claim 1, wherein the analysis project request pertains to an analysis project providing rates at which a product associated with the product identification code is repeat purchased by the consumer associated with the consumer identification code.

19. The method of claim 1, wherein: the one or more transaction records associates the product identification code with a vendor identification code; and
    the analysis project request pertains to an analysis project providing rates at which products associated with the vendor identification code are cross-purchased by the consumer associated with the consumer identification code.

20. The method of claim 1, wherein:
the one or more transaction records associates the product identification code with a vendor identification code; and
the analysis project request pertains to an analysis project providing a comparison of rates at which a product associated with a first vendor identification code and a product associated with a second vendor identification code are purchased.

21. The method of claim 1, wherein:
the one or more transaction records associates the consumer identification code with a purchaser category; and
the analysis project request pertains to an analysis project providing a comparison of rates at which a product associated with the product identification code is purchased by consumers in different purchaser categories.

22. The method of claim 21, wherein the purchaser categories are defined based upon demographic information associated with the consumer identification code.

23. The method of claim 21, wherein the purchaser categories are defined based upon data derived from shopping histories associated with the consumer identification code.

24. The method of claim 23, wherein the purchaser categories are defined based upon data associated with price sensitivity associated with the consumer identification code.

25. The method of claim 1, further comprising the step of collecting at least a portion of the at least one of transaction and consumer data from shopper loyalty card data.

26. The method of claim 1, wherein the step of generating, by the computer system, an analysis project includes the steps of:
obtaining, by the computer system, a spreadsheet template; and
inserting, by the computer system, the result data into the spreadsheet template to provide the analysis project.

27. The method of claim 26, wherein the spreadsheet template is an interactive spreadsheet template and the analysis project is an interactive analysis project.

28. The method of claim 26, wherein the spreadsheet template is obtained based, at least in part, upon the selected analysis project.

29. A method for performing a transactional analysis, comprising the steps of:
providing one or more databases that include at least one of transaction and consumer data for one or more establishments;
providing a computer system having access to the one or more databases;
obtaining from a user, through a computer interface provided by the computer system, an analysis project selection;
obtaining from the user, through the computer interface provided by the computer system, parameters for analysis of the at least one of transaction and consumer data, the parameters for analysis including an identification of retail products for analysis and an identification of a timeframe for analysis;
feeding, by the computer system, the obtained parameters into a template of executable database analysis scripts, which corresponds to the analysis project selection, to produce an executable job file;
executing, by the computer system, the executable job file on the at least one of transaction and consumer data to return results; and
presenting to the user a project reflecting the returned results.

30. The method of claim 29, wherein the parameters for analysis include parameters relating to measures of retail sales.

31. The method of claim 30, wherein the parameters for analysis include an identification of an analysis format.

32. The method of claim 31, wherein the analysis format pertains to rates at which consumers make repeat purchases of a retail product.

33. The method of claim 31, wherein the analysis format pertains to rates at which consumers make repeat purchases of a retail product at a particular type of retail establishment.

34. The method of claim 31, wherein the analysis format pertains to an identification of successful or unsuccessful recently-launched retail products for a retail establishment.

35. The method claim 31, wherein the analysis format pertains to rates at which consumers cross-shop a vendor's retail products.

36. The method of claim 31, wherein the analysis format pertains to rates at which consumers cross-shop a vendor's retail products at one of a particular retail establishment and a particular type of retail establishment.

37. The method of claim 31, wherein the analysis format pertains to key sales measures in a particular retail product category.

38. The method of claim 31, wherein the analysis format pertains to key sales measures for a vendor's retail products.

39. The method of claim 38, wherein the analysis format pertains to key sales measures for the vendor's retail products over time.

40. The method of claim 31, wherein the analysis format pertains to key sales measures for a particular brand of retail products over time.

41. The method of claim 31, wherein the analysis format pertains to other retail products purchased by consumers of a vendor's retail products.

42. The method of claim 31, wherein the analysis pertains to locations where a particular retail product is sold.

43. The method of claim 31, wherein the analysis pertains to locations where a vendor's brand of retail products is sold.

44. The method of claim 31, wherein the analysis pertains to types of consumers who purchase the vendor's retail products.

45. The method of claim 44, wherein the analysis pertains to types of consumers who purchase the vendor's retail products over time.

46. The method of claim 44, wherein the analysis pertains to types of consumers who purchase the vendor's retail products in one of a particular retail establishment and a particular type of retail establishment.

47. The method of claim 31, wherein, in the step of obtaining from the user, through the computer interface provided by the computer system parameters for analysis of the at least one of transaction and consumer data, the user is prompted to select at least one of the parameters for analysis from a menu containing a plurality of available parameters.

48. The method of claim 47, wherein the user is prompted to select each of the parameters for analysis from the menu.

49. The method of claim 31, wherein the computer interface is a web-based interface.

50. The method of claim 49, further comprising, prior to the obtaining step, a step of verifying that the user has rights to access the computer system.

51. The method of claim 31, wherein:
the project reflecting the returned results is presented as a spreadsheet file;
the method further comprises a step of generating the spreadsheet file from the returned results; and the generating step including the steps of selecting a spreadsheet project template from a plurality of available spreadsheet project templates based, at least in part, upon the analysis project selection and populating the spreadsheet project template with at least a portion of the returned results.

52. The method of claim 29, wherein at least one of transaction and consumer data includes an identity of products purchased, quantity of products purchased, date of purchase, and a code related to a particular purchasing consumer.

53. The method of claim 29, wherein the project reflecting the returned results is presented as an interactive project.

54. The method of claim 53, further comprising a step of generating the interactive project from the returned results, the generating step including the steps of selecting a project template from a plurality of available project templates based upon at least the analysis project selection and populating the project template with at least a portion of the returned results.

55. The method of claim 53, wherein the interactive project provides the ability for a user to toggle between two or more different formats of display of the returned results.

56. The method of claim 55, wherein the two or more different formats of display of the returned results includes a bar-graph display.

57. The method of claim 55, wherein the two or more different formats of display of the returned results includes a Venn diagram display.

58. The method of claim 29, wherein the step presenting to the user a project reflecting the returned analysis includes the steps of:
 notifying the user of the availability of the project; and
 providing the user with access to the project after notifying the user and upon the user requesting access to the project.

59. The method of claim 58, wherein the step of providing the user with access to the project includes the step of downloading the project to the user's computer.

60. The method of claim 58, wherein the step of providing the user with access to the project includes the step of providing the access to the project to the user via a web-based interface.

61. The method of claim 29, further comprising:
 determining the user's permission rights to access the computer system; and
 wherein the step of obtaining from the user, through the computer interface provided by the computer system, an analysis project request includes providing a menu to the user interface that comprises a list of available project requests that may be selected by the user and the list of available project requests is provided, at least in part, based upon the user's permission rights.

62. A computerized system for performing analysis comprising:
 one or more databases having at least one of transaction and consumer data for one or more establishments, the at least one of transaction and consumer data including one or more transaction records associating at least a product identification code with a consumer identification code;
 a plurality of analysis project script executable code templates and a plurality of analysis project interactive output spreadsheet templates; and
 a computer system having access to the database and the plurality of analysis project script templates and analysis project interactive output spreadsheet templates, the computer system being configured to perform the steps of:
  obtaining parameters for analysis of the at least one of transaction and consumer data, the parameters for analysis including an identification of retail products for analysis and an identification of a timeframe for analysis;
  feeding the obtained parameters into a selected one of the plurality of analysis project script templates to produce an executable job file;
  executing the executable job file on the at least one of transaction and consumer data to return results;
  inserting the returned results into a selected one of the plurality of analysis project interactive output spreadsheet templates to produce an interactive output; and
  inserting the returned results into a selected one of the plurality of analysis project interactive output spreadsheet templates to produce an interactive output; and
  transmitting the interactive output to a user interface operatively coupled to the computer system.

63. The computerized system of claim 62, wherein the one or more transaction records associates the product identification code and the consumer identification code with a transaction price.

64. The computerized system of claim 62, wherein the project provides rates at which a product associated with the product identification code is repeat purchased by the consumer associated with the consumer identification code.

65. The computerized system of claim 62, wherein:
 the one or more databases include one or more product records that associate the product identification code with a vendor identification code; and
 the project provides rates at which products associated with the vendor identification code are cross-purchased by the consumer associated with the consumer identification code.

66. The computerized system of claim 62, wherein:
 the one or more databases include one or more product records that associate the product identification code with a vendor identification code; and
 the project provides rates at which a product associated with a first vendor identification code and a product associated with a second vendor identification code are purchased.

67. The computerized system of claim 62, wherein:
 the one or more databases include one or more consumer records that associate the consumer identification code with a purchaser category; and
 the project provides a comparison of rates at which a product associated with the product identification code is purchased by consumers in different consumer categories.

68. The computerized system of claim 67, wherein the consumer categories are defined based upon demographic information associated with the consumer identification code.

69. The computerized system of claim 67, wherein the consumer categories are defined based upon data derived from shopping histories associated with the consumer identification code.

70. The method of claim 69, wherein the consumer categories are defined based upon data associated with price sensitivity associated with the consumer identification code.

71. The computerized system of claim 62, the at least one of transaction and consumer data is taken from shopper loyalty card data.

72. The computerized system of claim 62, wherein the selected one of the plurality of interactive output spreadsheet templates provides the ability for a user to toggle between two or more different formats of display of the returned results.

73. The computerized system of claim 72, wherein the two or more different formats of display of the returned results includes a bar-graph display.

74. The computerized system of claim 73, wherein the two or more different formats of display of the returned results includes a Venn diagram display.

* * * * *